United States Patent
Scott et al.

(10) Patent No.: US 12,486,391 B2
(45) Date of Patent: Dec. 2, 2025

(54) USES OF STYRENIC POLYMERS DERIVED THROUGH DEPOLYMERIZED POLYSTYRENE

(71) Applicant: GreenMantra Recycling Technologies Ltd., Brantford (CA)

(72) Inventors: Benjamin Scott, Brantford (CA); Domenic Di Mondo, Brantford (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 987 days.

(21) Appl. No.: 17/083,681

(22) Filed: Oct. 29, 2020

(65) Prior Publication Data

US 2021/0087377 A1   Mar. 25, 2021

Related U.S. Application Data

(63) Continuation of application No. PCT/CA2019/050761, filed on May 31, 2019.
(Continued)

(51) Int. Cl.
*C08L 25/06* (2006.01)
*C08F 2/22* (2006.01)
(Continued)

(52) U.S. Cl.
CPC ............... *C08L 25/06* (2013.01); *C08F 2/22* (2013.01); *C08F 2/50* (2013.01); *C08F 36/02* (2013.01);
(Continued)

(58) Field of Classification Search
CPC ...... C08L 25/06; C08J 2325/06; Y02W 30/62; C08F 8/50; C09D 125/06; C09D 11/023; C09D 11/101; C08K 5/0041
See application file for complete search history.

(56) References Cited

U.S. PATENT DOCUMENTS

| | | | |
|---|---|---|---|
| 2,549,538 A | 4/1951 | Sparks et al. | |
| 2,835,659 A | 5/1958 | Guillet | |

(Continued)

FOREIGN PATENT DOCUMENTS

| | | | |
|---|---|---|---|
| AU | 2017218908 A1 | 8/2018 | |
| CA | 2098778 A1 | 12/1993 | |

(Continued)

OTHER PUBLICATIONS

JP-2005298802-A, Oct. 2005, Machine translation (Year: 2005).*
(Continued)

*Primary Examiner* — Satya B Sastri
(74) *Attorney, Agent, or Firm* — Cook Alex Ltd.

(57) ABSTRACT

A latex and solution with UV-active monomers created using styrenic polymers created via the depolymerization of a polystyrene feedstock. In some embodiments the polystyrene feedstock contains recycle polystyrene. In some embodiments, the styrenic polymers contain olefins. In some embodiments, the latex and solution with UV-active monomers are used in ink formulations. In some embodiments, latex and solution UV-active monomers can replace styrenated acrylics within flexo and/or gravure ink formulations. Other applications of the latex and solution with UV-active monomers can include, but are not limited to, coatings, paints, adhesives. Additional applications of the latex can include but are not limited to immunoassays.

16 Claims, 11 Drawing Sheets

Related U.S. Application Data

(60) Provisional application No. 62/678,780, filed on May 31, 2018.

(51) Int. Cl.
| | |
|---|---|
| *C08F 2/50* | (2006.01) |
| *C08F 36/02* | (2006.01) |
| *C08F 36/22* | (2006.01) |
| *C08K 3/013* | (2018.01) |
| *C08K 5/00* | (2006.01) |
| *C09D 11/107* | (2014.01) |

(52) U.S. Cl.
CPC .............. *C08F 36/22* (2013.01); *C08K 3/013* (2018.01); *C08K 5/0041* (2013.01); *C09D 11/107* (2013.01)

(56) References Cited

U.S. PATENT DOCUMENTS

| | | | |
|---|---|---|---|
| 3,033,256 | A | 5/1962 | Schrenk |
| 3,143,536 | A | 8/1964 | Guzzetta et al. |
| 3,278,513 | A | 10/1966 | Jahrstorfer et al. |
| 3,332,926 | A | 7/1967 | Baron et al. |
| 3,345,352 | A | 10/1967 | Baron et al. |
| 3,411,179 | A | 11/1968 | Gregory et al. |
| 3,424,822 | A | 1/1969 | Liston |
| 3,441,628 | A | 4/1969 | Raetzsch et al. |
| 3,642,722 | A | 2/1972 | Knowles et al. |
| 3,927,693 | A | 12/1975 | Johnston |
| 3,962,092 | A | 6/1976 | Newman |
| 4,053,141 | A | 10/1977 | Gussefeld |
| 4,059,525 | A | 11/1977 | Krasnow |
| 4,105,806 | A | 8/1978 | Watt |
| 4,127,619 | A | 11/1978 | Godfrey |
| 4,136,251 | A | 1/1979 | Bice et al. |
| 4,178,272 | A | 12/1979 | Meyer et al. |
| 4,208,252 | A | 6/1980 | Yoshida et al. |
| 4,497,921 | A | 2/1985 | Chang et al. |
| 4,620,032 | A | 10/1986 | Doerr |
| 4,642,401 | A | 2/1987 | Coenen et al. |
| 4,847,209 | A | 7/1989 | Lewis et al. |
| 4,911,952 | A | 3/1990 | Doane et al. |
| 5,158,982 | A | 10/1992 | Stapp |
| 5,292,862 | A | 3/1994 | Miura et al. |
| 5,314,741 | A | 5/1994 | Roberts et al. |
| 5,315,055 | A | 5/1994 | Butcher et al. |
| 5,354,930 | A | 10/1994 | Atkins et al. |
| 5,369,215 | A | 11/1994 | Platz |
| 5,386,055 | A | 1/1995 | Lee et al. |
| 5,481,052 | A | 1/1996 | Hardman et al. |
| 5,502,263 | A | 3/1996 | Ponsford et al. |
| 5,525,216 | A * | 6/1996 | Matasovic ................ C02F 3/28 366/279 |
| 5,608,136 | A | 3/1997 | Maezawa et al. |
| 5,656,757 | A | 8/1997 | Jenczewski et al. |
| 5,672,794 | A | 9/1997 | Northemann |
| 5,728,909 | A | 3/1998 | Butcher, Jr. |
| 5,731,483 | A | 3/1998 | Stabel et al. |
| 5,821,395 | A | 10/1998 | Price et al. |
| 5,830,927 | A * | 11/1998 | Vanderhoff .......... C09D 11/101 106/31.78 |
| 5,849,964 | A | 12/1998 | Holighaus et al. |
| 5,876,644 | A | 3/1999 | Nichols et al. |
| 5,990,206 | A | 11/1999 | Tanaka et al. |
| 6,143,940 | A | 11/2000 | Miller et al. |
| 6,150,577 | A | 11/2000 | Miller et al. |
| 6,172,271 | B1 | 1/2001 | Horizoe et al. |
| 6,172,275 | B1 | 1/2001 | Tadauchi et al. |
| 6,184,427 | B1 | 2/2001 | Klepfer et al. |
| 6,211,331 | B1 | 4/2001 | Craig |
| 6,268,046 | B1 | 7/2001 | Miller et al. |
| 6,288,296 | B1 | 9/2001 | Miller et al. |
| 6,822,126 | B2 | 11/2004 | Miller et al. |
| 7,834,226 | B2 | 11/2010 | Miller |
| 7,893,307 | B2 | 2/2011 | Smith |
| 7,923,506 | B2 | 4/2011 | Cohoon et al. |
| 7,951,239 | B2 | 5/2011 | Trumbore et al. |
| 8,168,839 | B2 | 5/2012 | Niu |
| 8,206,500 | B1 | 6/2012 | Mathis et al. |
| 8,609,778 | B1 | 12/2013 | Frost et al. |
| 8,664,458 | B2 | 3/2014 | Kumar et al. |
| 8,680,167 | B2 | 3/2014 | Agarwal et al. |
| 9,090,829 | B1 | 7/2015 | McGrevy et al. |
| 9,200,130 | B2 | 12/2015 | D'Amato et al. |
| 9,353,476 | B2 | 5/2016 | Henriksson et al. |
| 9,598,610 | B2 | 3/2017 | Hilsenbeck |
| 9,631,153 | B2 | 4/2017 | Unger et al. |
| 9,714,385 | B2 | 7/2017 | Khan et al. |
| 10,000,715 | B2 | 6/2018 | Kumar et al. |
| 10,308,896 | B2 | 6/2019 | Scheibel et al. |
| 10,358,603 | B1 | 7/2019 | Pour |
| 10,457,602 | B1 | 10/2019 | Davis |
| 10,457,886 | B2 | 10/2019 | Kumar et al. |
| 10,472,487 | B2 | 11/2019 | Gil et al. |
| 10,519,292 | B2 | 12/2019 | Yao et al. |
| 10,597,507 | B2 | 3/2020 | Di Mondo et al. |
| 10,723,858 | B2 | 7/2020 | Yao et al. |
| 10,870,739 | B2 | 12/2020 | Di Mondo |
| 10,907,353 | B2 | 2/2021 | LaTorre et al. |
| 11,046,613 | B2 | 6/2021 | Davis |
| 11,072,676 | B2 | 7/2021 | Di Mondo et al. |
| 11,192,999 | B2 | 12/2021 | Yao et al. |
| 11,220,586 | B2 | 1/2022 | Yao et al. |
| 11,279,811 | B2 | 3/2022 | Di Mondo et al. |
| 11,319,493 | B2 | 5/2022 | Daggupati et al. |
| 11,499,110 | B2 | 11/2022 | Celik et al. |
| 11,518,865 | B2 | 12/2022 | Joshi et al. |
| 11,596,935 | B2 | 3/2023 | Delferro et al. |
| 11,613,623 | B2 | 3/2023 | Kanattukara et al. |
| 11,780,985 | B2 | 10/2023 | Delferro et al. |
| 11,999,920 | B2 | 6/2024 | Arnst et al. |
| 12,031,097 | B2 | 7/2024 | Vyakaranam et al. |
| 12,152,111 | B2 | 11/2024 | Dubois |
| 12,172,935 | B2 | 12/2024 | Schweiger et al. |
| 2003/0003554 | A1 | 1/2003 | Miller et al. |
| 2003/0154885 | A1 | 8/2003 | Krendlinger et al. |
| 2003/0195278 | A1 | 10/2003 | Forgac et al. |
| 2003/0199718 | A1 | 10/2003 | Miller |
| 2003/0215588 | A1 | 11/2003 | Yeager et al. |
| 2003/0225213 | A1 | 12/2003 | Maehara et al. |
| 2004/0071953 | A1 * | 4/2004 | Sobieski ............... C09D 11/101 428/323 |
| 2004/0161570 | A1 | 8/2004 | Zanchetta et al. |
| 2005/0148487 | A1 | 7/2005 | Brownscombe et al. |
| 2005/0176866 | A1 | 8/2005 | Krendlinger et al. |
| 2006/0084764 | A1 | 4/2006 | Hanna et al. |
| 2006/0135713 | A1 | 6/2006 | Leclerc et al. |
| 2007/0117894 | A1 | 5/2007 | Bach et al. |
| 2007/0263060 | A1 | 11/2007 | Laksin et al. |
| 2008/0207811 | A1 * | 8/2008 | Brust ..................... C09D 11/40 524/401 |
| 2009/0036619 | A1 | 2/2009 | Herrmann et al. |
| 2009/0110925 | A1 | 4/2009 | Fukuda et al. |
| 2009/0321317 | A1 | 12/2009 | Widmer et al. |
| 2010/0227954 | A1 | 9/2010 | Naidoo et al. |
| 2010/0233408 | A1 | 9/2010 | Zickell et al. |
| 2011/0160356 | A1 | 6/2011 | Martin |
| 2011/0195256 | A1 | 8/2011 | Morikawa et al. |
| 2011/0196073 | A1 | 8/2011 | Fee et al. |
| 2012/0016169 | A1 | 1/2012 | Kumar |
| 2012/0108863 | A1 | 5/2012 | Tippet et al. |
| 2012/0136107 | A1 | 5/2012 | Fu et al. |
| 2012/0165455 | A1 | 6/2012 | Vitrano et al. |
| 2012/0296036 | A1 | 11/2012 | Allen et al. |
| 2012/0304879 | A1 | 12/2012 | Tiessen et al. |
| 2012/0310023 | A1 | 12/2012 | Huang et al. |
| 2013/0123396 | A1 | 5/2013 | Pochert |
| 2013/0137794 | A1 | 5/2013 | Kasper et al. |
| 2013/0137796 | A1 | 5/2013 | Kropp |
| 2013/0180431 | A1 | 7/2013 | Myszak, Jr. et al. |
| 2013/0303810 | A1 | 11/2013 | Handerek |
| 2014/0023870 | A1 | 1/2014 | Takamori |
| 2014/0046102 | A1 | 2/2014 | D'Amato et al. |

(56) References Cited

U.S. PATENT DOCUMENTS

| | | |
|---|---|---|
| 2014/0069297 A1 | 3/2014 | Rotz et al. |
| 2014/0107307 A1 | 4/2014 | Frost et al. |
| 2014/0134533 A1 | 5/2014 | Sacripante et al. |
| 2014/0182194 A1 | 7/2014 | Unger et al. |
| 2014/0299017 A1 | 10/2014 | Parvez et al. |
| 2015/0105494 A1 | 4/2015 | Naidoo et al. |
| 2015/0105496 A1 | 4/2015 | Naidoo et al. |
| 2015/0203731 A1 | 7/2015 | Herrlich et al. |
| 2015/0210611 A1 | 7/2015 | Tippet et al. |
| 2015/0247096 A1 | 9/2015 | Barger et al. |
| 2015/0322263 A1 | 11/2015 | Hilsenbeck |
| 2015/0361374 A1 | 12/2015 | Kumar et al. |
| 2016/0002508 A1 | 1/2016 | Kanderski et al. |
| 2016/0017148 A1 | 1/2016 | Ruan et al. |
| 2016/0024390 A1 | 1/2016 | Ullom |
| 2016/0040074 A1 | 2/2016 | Methling |
| 2016/0053150 A1 | 2/2016 | Croteau et al. |
| 2017/0015876 A1 | 1/2017 | Schroeyers et al. |
| 2017/0232416 A1 | 8/2017 | Gil et al. |
| 2017/0283525 A1 | 10/2017 | Li et al. |
| 2017/0290945 A1 | 10/2017 | Hanson et al. |
| 2017/0306152 A1 | 10/2017 | Shulga et al. |
| 2018/0127522 A1 | 5/2018 | Land et al. |
| 2018/0208731 A1 | 7/2018 | Vankayala |
| 2018/0312694 A1 | 11/2018 | Naidoo et al. |
| 2018/0346683 A1 | 12/2018 | DiMondo et al. |
| 2018/0371325 A1 | 12/2018 | Streiff et al. |
| 2019/0062518 A1 | 2/2019 | Jurek et al. |
| 2019/0119191 A1 | 4/2019 | Streiff et al. |
| 2019/0194375 A1 | 6/2019 | Di Mondo et al. |
| 2019/0249088 A1 | 8/2019 | Pour |
| 2019/0322834 A1 | 10/2019 | Yao et al. |
| 2020/0172779 A1 | 6/2020 | Di Mondo |
| 2020/0392319 A1 | 12/2020 | Di Mondo et al. |
| 2021/0061971 A1 | 3/2021 | Delferro et al. |
| 2021/0087113 A1 | 3/2021 | Di Mondo et al. |
| 2021/0108154 A1 | 4/2021 | Scheibel et al. |
| 2021/0324127 A1 | 10/2021 | Di Mondo et al. |
| 2022/0022528 A1 | 1/2022 | Chen et al. |
| 2022/0025151 A1 | 1/2022 | Di Mondo et al. |
| 2022/0089831 A1 | 3/2022 | Kanattukara et al. |
| 2022/0112352 A1 | 4/2022 | Nagy et al. |
| 2022/0119635 A1 | 4/2022 | Youngstrom et al. |
| 2022/0177705 A1 | 6/2022 | Almey et al. |
| 2022/0340819 A1 | 10/2022 | Gray et al. |
| 2023/0313531 A1 | 10/2023 | Balheda et al. |
| 2024/0093033 A1 | 3/2024 | Kanaujia et al. |
| 2024/0327715 A1 | 10/2024 | Brita et al. |

FOREIGN PATENT DOCUMENTS

| | | |
|---|---|---|
| CA | 2162005 A1 | 5/1996 |
| CA | 2202941 A1 | 10/1998 |
| CA | 2805570 A1 | 1/2012 |
| CA | 2812961 A1 | 1/2012 |
| CA | 2822678 A1 | 2/2014 |
| CA | 2883204 A1 | 3/2014 |
| CA | 2898257 A1 | 7/2014 |
| CA | 3129563 A1 | 7/2014 |
| CA | 2885144 A1 | 3/2015 |
| CA | 2890874 A1 | 11/2015 |
| CA | 2822678 C | 5/2017 |
| CA | 2981710 A1 | 4/2018 |
| CH | 646717 A5 | 12/1984 |
| CN | 1120347 A | 4/1996 |
| CN | 1712465 A | 12/2005 |
| CN | 101103066 A | 1/2008 |
| CN | 01205390 A | 6/2008 |
| CN | 01205402 A | 6/2008 |
| CN | 101205390 A | 6/2008 |
| CN | 101205396 A | 6/2008 |
| CN | 101205402 A | 6/2008 |
| CN | 101205407 A | 6/2008 |
| CN | 101434821 B | 5/2009 |
| CN | 101502993 A | 8/2009 |
| CN | 101704932 A | 5/2010 |
| CN | 101787102 A | 7/2010 |
| CN | 101970095 A | 2/2011 |
| CN | 102066525 A | 5/2011 |
| CN | 102205220 A | 10/2011 |
| CN | 102989338 A | 3/2013 |
| CN | 103146267 A | 6/2013 |
| CN | 103429675 A | 12/2013 |
| CN | 103509496 A | 1/2014 |
| CN | 104449090 A | 3/2015 |
| CN | 103168016 A | 4/2015 |
| CN | 104552735 A | 4/2015 |
| CN | 104847921 A | 8/2015 |
| CN | 104877699 A | 9/2015 |
| CN | 104910511 A | 9/2015 |
| CN | 105102519 A | 11/2015 |
| CN | 105143326 A | 12/2015 |
| CN | 105153511 A | 12/2015 |
| CN | 105219406 A | 1/2016 |
| CN | 105315391 A | 2/2016 |
| CN | 106413876 A | 2/2017 |
| CN | 106700975 A | 5/2017 |
| CN | 106753057 A | 5/2017 |
| CN | 107286277 A | 10/2017 |
| CN | 107629565 A | 1/2018 |
| CN | 206983219 U | 2/2018 |
| CN | 108473808 A | 8/2018 |
| CN | 108883551 B | 11/2018 |
| CN | 110105474 A | 8/2019 |
| CN | 111607171 A | 9/2020 |
| CN | 112694552 A | 4/2021 |
| CN | 113185626 A | 7/2021 |
| CN | 112779045 B | 10/2021 |
| CN | 113462175 A | 10/2021 |
| CN | 113621189 A | 11/2021 |
| CN | 113751051 A | 12/2021 |
| CN | 115044219 A | 9/2022 |
| CN | 116102742 A | 5/2023 |
| CN | 116162287 A | 5/2023 |
| DE | 1570194 A1 | 8/1969 |
| DE | 3642273 A1 | 4/1987 |
| DE | 19500425 C1 | 4/1996 |
| DE | 69323125 T2 | 8/1999 |
| DE | 10037229 A1 | 2/2000 |
| DE | 10022666 A1 | 11/2001 |
| DE | 102018214702 A1 | 9/2019 |
| EP | 0577279 A1 | 1/1994 |
| EP | 0717094 A1 | 6/1996 |
| EP | 0577279 B1 | 1/1999 |
| EP | 1707614 A1 | 10/2006 |
| EP | 2161299 A1 | 3/2010 |
| EP | 2283094 B1 | 10/2012 |
| EP | 3519487 | 4/2018 |
| EP | 3397442 A1 | 11/2018 |
| EP | 3414295 A1 | 12/2018 |
| EP | 3441136 A1 | 12/2020 |
| EP | 3867312 A1 | 8/2021 |
| EP | 4206306 A1 | 7/2023 |
| ES | 539973 | 4/1986 |
| ES | 539973 A0 | 4/1986 |
| GB | 569043 A | 5/1945 |
| GB | 690623 A | 4/1953 |
| GB | 1310260 A | 3/1973 |
| GB | 1563440 A | 3/1980 |
| GB | 2402397 A | 12/2004 |
| JP | S48000661 A | 1/1973 |
| JP | S51125412 A | 11/1976 |
| JP | S 59217777 A | 12/1984 |
| JP | H01150857 A | 6/1989 |
| JP | 03292305 A | 12/1991 |
| JP | H03292305 A | 12/1991 |
| JP | H0457887 A | 2/1992 |
| JP | H04100807 A | 4/1992 |
| JP | H0552849 A | 3/1993 |
| JP | H05085964 A | 4/1993 |
| JP | H06179877 A | 6/1994 |
| JP | H08508520 A | 9/1996 |
| JP | H08253601 A | 10/1996 |
| JP | H10-501563 A | 10/1998 |

(56) References Cited

FOREIGN PATENT DOCUMENTS

| | | | | |
|---|---|---|---|---|
| JP | H11302663 | A | 11/1999 | |
| JP | H122000512209 | A | 9/2000 | |
| JP | H132001040132 | A | 2/2001 | |
| JP | H142002167466 | A | 6/2002 | |
| JP | H142002224652 | A | 8/2002 | |
| JP | H142002256103 | A | 9/2002 | |
| JP | 2003252676 | A | 9/2003 | |
| JP | H152003252676 | A | 9/2003 | |
| JP | H152003292594 | A | 10/2003 | |
| JP | H162004131675 | A | 4/2004 | |
| JP | H172005170986 | A | 6/2005 | |
| JP | H172005200573 | A | 7/2005 | |
| JP | H172005527672 | A | 9/2005 | |
| JP | 2005298802 | A * | 10/2005 | C09D 11/16 |
| JP | H172005298802 | A | 10/2005 | |
| JP | H182006056957 | A | 3/2006 | |
| JP | H182006143802 | A | 6/2006 | |
| JP | 2007169531 | A | 7/2007 | |
| JP | H192007169531 | A | 7/2007 | |
| JP | H192007529574 | A | 10/2007 | |
| JP | H202008525573 | A | 7/2008 | |
| JP | H212009173874 | A | 8/2009 | |
| JP | H232011126995 | A | 6/2011 | |
| JP | H232011225641 | A | 10/2011 | |
| JP | H252013539476 | A | 10/2013 | |
| JP | H272015512965 | A | 4/2015 | |
| JP | H272015512972 | A | 4/2015 | |
| JP | H282016523986 | A | 8/2016 | |
| JP | H292017513964 | A | 6/2017 | |
| JP | 2018203877 | A * | 12/2018 | |
| JP | R12019508524 | A | 3/2019 | |
| KR | 100680677 | B1 | 2/2007 | |
| KR | 100899029 | B1 | 5/2009 | |
| KR | 100949381 | B1 | 3/2010 | |
| KR | 20110051520 | A | 5/2011 | |
| KR | 101487772 | B1 | 1/2015 | |
| RO | 131874 | A2 | 5/2017 | |
| WO | WO 1989000419 | A1 | 1/1989 | |
| WO | 9506684 | | 3/1995 | |
| WO | 9533790 | | 12/1995 | |
| WO | 2000027942 | A1 | 5/2000 | |
| WO | WO 2002090403 | A1 | 11/2002 | |
| WO | 2005092963 | A1 | 10/2005 | |
| WO | 2006071214 | A1 | 7/2006 | |
| WO | 2010023173 | A1 | 3/2010 | |
| WO | 2010081054 | A1 | 7/2010 | |
| WO | 2010099963 | A1 | 9/2010 | |
| WO | WO 2012007833 | A2 | 1/2012 | |
| WO | WO 2014110644 | A1 | 7/2014 | |
| WO | WO 2014161767 | A2 | 10/2014 | |
| WO | WO 2015130545 | A1 | 9/2015 | |
| WO | 2015164017 | A1 | 10/2015 | |
| WO | 2015164331 | A1 | 10/2015 | |
| WO | 2017113020 | A1 | 7/2017 | |
| WO | WO 2017136957 | A1 | 8/2017 | |
| WO | WO-2017139333 | A1 * | 8/2017 | C08F 12/08 |
| WO | WO 2017161463 | A1 | 9/2017 | |
| WO | WO 2017167947 | A1 | 10/2017 | |
| WO | WO 2018058257 | A1 | 4/2018 | |
| WO | 2018158285 | A1 | 9/2018 | |
| WO | WO 2019041049 | A1 | 3/2019 | |
| WO | 2019104430 | A1 | 6/2019 | |
| WO | WO 2019195915 | A1 | 10/2019 | |
| WO | 2019227233 | A1 | 12/2019 | |
| WO | WO 2019227234 | A1 | 12/2019 | |
| WO | WO 2020118453 | A1 | 6/2020 | |
| WO | WO 2020198871 | A1 | 10/2020 | |
| WO | 2021048187 | A1 | 3/2021 | |
| WO | WO 2021035351 | A1 | 3/2021 | |
| WO | WO 2021113951 | A1 | 6/2021 | |
| WO | 2022015971 | A1 | 1/2022 | |
| WO | 2022167903 | A1 | 8/2022 | |
| WO | 2023059623 | A1 | 4/2023 | |
| WO | 2023088861 | A1 | 5/2023 | |
| WO | 2023121379 | A1 | 6/2023 | |
| WO | 2023141665 | A1 | 7/2023 | |

OTHER PUBLICATIONS

JP 2018203877 A, machine translation, 2018 (Year: 2018).*

Kartalis et al., Recycling of post-used PE packaging film using the restabilization technique, Poly. Degrad. and Stab., 2000, vol. 70(2), pp. 189-197.

Rosa et al., Processing and thermal, mechanical and morphological characterization of post-consumer polyolefins/thermoplastic starch blends, J. of Mat. Sci., 2007, 42(2), pp. 551-557.

Urbaniak et al. "Waxes—Products of Thermal Degradation of Waste Plastics—Obtaining, Capabilities, and Application", Archives of Waste Management and Environmental Protection, vol. 6, 2007, pp. 71-78.

Garcia et al., Recycling extruded polystyrene by dissolution with suitable solvents, J. of Mat. Cycles and Waste Management, 2009, vol. 11(1), pp. 2-5.

Arabiourrutia, "Characterization of the waxes obtained by the pyrolysis of polyolefin plastics in a conical spouted bed reactor"; Journal of Analytical and Applied Pyrolysis, 2012, vol. 94, pp. 230-237.

"SCRA Spinout Case Study—Recycling Technologies", Sep. 2015, pp. 1-3, Retrieved from the Internet: https://warwick.ac.uk/fac/crossfac/sciencecity/casestudies/recycling-technologies/ [retrieved on Aug. 22, 2019].

Office Action dated on Jun. 3, 2021 in connection with Chinese Application No. 201780059004.9.

Office Action issued on Jul. 5, 2021 in connection with Brazilian App. No. 11 2018 016499 2.

Office Action dated Jul. 6, 2021 issued in connection with JP App. No. 2019-517089.

Office Action issued on Jul. 29, 2021 in connection with Brazilian App. No. 11 2018 068992 0.

Office Action issued on Aug. 12, 2021 in connection with Brazilian App. No. 11 2019 006300 5.

Office Action issued on Aug. 30, 2021 in connection with Mexican App. No. MX/a/2018/008117.

Examination Report No. 1 issued on Sep. 8, 2021 in connection with Australian application No. 2017218908.

European Office Action dated Oct. 5, 2021 issued in connection with European App. No. 17854306.2.

Office Action dated Jul. 1, 2022, issued in connection with Brazilian Application No. BR 11 2018 068992 0.

Office Action dated Jul. 13, 2022, issued in connection with Brazilian Application No. BR 11 2020 010448 5.

Office Action dated Aug. 23, 2022, issued in connection with Brazilian Application No. BR 11 2020 024507 0.

Office Action dated Sep. 23, 2022, issued in connection with Brazilian Application No. BR 11 2019 006300 5.

Office Action dated Nov. 17, 2022, issued in connection with Canadian Application No. 3,013,953.

Extended European Search Report dated Nov. 21, 2022, issued in connection with European Application No. 20784475.4.

Extended European Search Report dated May 3, 2021 issued in connection with EP. App. No. 18851118.2.

Office Action dated May 23, 2023, issued in connection with Japanese Application No. 2020-566670.

Office Action dated Jul. 6, 2023, issued in connection with Chinese Application No. 201880076385.6.

Office Action dated on Feb. 2, 2021 in connection with Chinese Application No. 201780018293.8.

Office Action dated on Feb. 9, 2021 in connection with Chinese Application No. 201780011193.2.

Examination Report No. 1 issued on Mar. 30, 2021 in connection with Australian application No. 2017333737.

International Search Report and Written Opinion dated Apr. 15, 2021 in connection with International Application No. PCT/CA2020/000141.

(56) References Cited

OTHER PUBLICATIONS

Canadian Office Action dated Apr. 20, 2021 issued in connection with Canadian App. No. 3096804.
Notice of Acceptance dated Jan. 4, 2022, issued in connection with Australian Application No. 2017333737.
Extended European Search Report dated Feb. 16, 2022, issued in connection with European Application No. EP 19811163.5.
Examination Report dated Mar. 1, 2022, issued in connection with European Application No. 17769226.6.
International Preliminary Report on Patentability dated Mar. 1, 2022 in connection with International Application No. PCT/CA2020/051166.
Office Action dated Mar. 1, 2022, issued in connection with Mexican Application No. MX/a/2018/008117.
Office Action dated Mar. 2, 2022, issued in connection with Chinese Application No. 201780018293.8.
Office Action dated Apr. 5, 2022, issued in connection with Japanese Application No. 2019-517089.
Office Action dated May 13, 2022, issued in connection with Brazilian Application No. BR 11 2020 004155 6.
International Preliminary Report on Patentability dated May 17, 2022 in connection with International Application No. PCT/CA2020/000141.
Extended European Search Report dated Jun. 3, 2022, issued in connection with European Application No. 19894673.3.
Office Action dated Jun. 10, 2022, issued in connection with Thai Application No. 1801005835.
Office Action dated Jun. 21, 2022, issued in connection with Chinese Application No. 201780018293.8.
Simnofske, D. et al. "Benefits of F-T Wax Based Warm Asphalt Mixes for Short-Term Binder Aging and Pavement Durability", Jun. 1, 2016, Proceedings of 6th Eurasphalt & Europbitume Congress.
Office Action published Aug. 15, 2023, issued in connection with Brazilian Application No. BR 11 2020 024507 0.
Office Action dated Aug. 16, 2023, issued in connection with Canadian Application No. 3,013,953.
Extended European Search Report dated Aug. 24, 2023, issued in connection with European Application No. 20858584.4.
Office Action dated Sep. 4, 2023, issued in connection with Chinese Application No. 201980043504.2.
Office Action dated Sep. 13, 2023, issued in connection with Brazilian Application No. BR 11 2021 019925 0.
Office Action dated Sep. 27, 2023, issued in connection with Mexican Application No. MX/a/2018/011492.
International Preliminary Report on Patentability dated Aug. 23, 2018 issued in connection with International App. No. PCT/CA2017/050172.
International Preliminary Report on Patentability dated Oct. 4, 2018 issued in connection with International App. No. PCT/CA2017/050378.
International Search Report and Written Opinion dated Nov. 16, 2018 issued in connection with PCT/CA2018/051058.
International Search Report and Written Opinion dated Feb. 5, 2019 issued in connection with International App. No. PCT/CA2018/051517.
International Preliminary Report on Patentability dated Apr. 11, 2019 issued in connection with International App. No. PCT/CA2017/051166.
Examination Report No. 1 issued on May 1, 2019 in connection with Australian App. No. 2018204945.
International Search Report and Written Opinion dated Jul. 4, 2019 issued in connection with International App. No. PCT/CA2019/000046.
International Search Report and Written Opinion dated Jul. 12, 2019 issued in connection with International App. No. PCT/CA2019/050762.
International Search Report and Written Opinion dated Jul. 26, 2019 issued in connection with International App. No. PCT/CA2019/050761.
Extended European Search Report dated Aug. 23, 2019 issued in connection with European App. No. 16880228.8.
Extended European Search Report dated Sep. 4, 2019 issued in connection with European App. No. 17769226.6.
Notice of Acceptance for Patent App. dated Sep. 6, 2019 issued in connection with Australian App. No. 2018204945.
Extended European Search Report dated Oct. 7, 2019 issued in connection with European App. No. 17749885.4.
Office Action issued on Jan. 13, 2020 issued in connection with Brazilian App. No. 11 2013 001058 4.
Canadian Office Action dated Jan. 24, 2020 issued in connection with Canadian App. No. 2898257.
Examination Report No. 1 dated Feb. 26, 2020 issued in connection with Australian App. No. 2017239181.
Office Action dated Feb. 28, 2020 issued in connection with Brazilian App. No. 11 2018 013600 0.
Office Action dated Mar. 2, 2020 issued in connection with Chinese App. No. 201680082803.3.
International Preliminary Report on Patentability dated Mar. 3, 2020 issued in connection with International App. No. PCT/CA2018/051058.
International Search Report and Written Opinion dated Mar. 19, 2020 issued in connection with International App. No. PCT/CA2019/051814.
Partial European Search Report dated Mar. 20, 2020 issued in connection with European App. No. 17854306.2.
Office Action dated Apr. 28, 2020 issued in connection with Canadian App. No. 2898257.
Office Action dated May 26, 2020 issued in connection with Japanese App. No. 2018-534826.
International Search Report and Written Opinion dated Jun. 9, 2020 issued in connection with International App. No. PCT/CA2020/050439.
Office Action dated Jun. 15, 2020 issued in connection with Chinese App. No. 201780011193.2.
Extended European Search Report dated Jun. 29, 2020 issued in connection with European App. No. 17854306.2.
Office Action dated Jun. 30, 2020 issued in connection with Japanese App. No. 2018-542700.
Notice of Allowance dated Jul. 1, 2020 in connection with Brazilian App. No. 11 2013 001058 4.
Notice of Allowance dated Oct. 13, 2020 issued in connection with Japanese App. No. 2018-534826.
Office Action dated Oct. 22, 2020 issued in connection with Chinese App. No. 201680082803.3.
Office Action dated Nov. 24, 2020 issued in connection with Japanese App. No. 2018-542700.
Canadian Office Action dated Nov. 25, 2020 issued in connection with Canadian App. No. 3096804.
Notice of Acceptance dated Nov. 30, 2020 issued in connection with Australian App. No. 2017239181.
International Search Report and Written Opinion dated Nov. 30, 2020 issued in connection with International App. No. PCT/CA2020/051166.
Extended European Search Report dated Dec. 17, 2020 issued in connection with European App. No. 16880228.8.
Tordella et al., "Isomorphic Interactions of Ethylenic Polymers and Paraffin Wax", J. of Polymer Science, vol. 8, 1970, pp. 81-87.
"SCRA Spinout Case Study—Recycling Technologies", Sep. 2015, pp. 1-3, Retrieved from the Internet: https://warwick.acuk/fac/crossfac/sciencecity/casestudies/recycling-tecnnologies/ [retrieved on Aug. 22, 2019].
Perez, Ignacio et al., "Use of Lignin Biopolymer From Industrial Waste as Bitumen Extender for Asphalt Mixtures", Journal of Cleaner Production, vol. 220, pp. 87-98, XP085643290, ISSN: 0959-6526, DOI: 10.1016/J.JCEPRO.2019.02.08.
White, "Laboratory Evaluation of Asphalt Containing Recycled Plastic as a Bitumen Extended and Modifier", Oct. 28, 2019, Journal of Traffic and Transportation Engineering, vol. 7, No. 5, retrieved from the internet: https://www.researchgate.net/profile/Greg-White/publication/337210894_Laboratory_Evaluation_of_Asphalt_Containing Recycled_Plastic_as_a_Bitumen_Extender_and_Modifier.pdf.

(56) References Cited

OTHER PUBLICATIONS

Office Action dated Mar. 20, 2023, issued in connection with Canadian Application 3,015,859.
Office Action dated Apr. 25, 2023, issued in connection with Mexican Application No. MX/a/2018/009808.
Examination Report dated May 17, 2023, issued in connection with European Application No. 20858584.4.
Office Action dated May 19, 2023, issued in connection with Mexican Application No. MX/a/2018/011492.
Yu, Peroxide modified polyolefin blends Part 1: Effects on LDPE/PP blends with components with similar initial viscosities, Adv. Polymer Tech., vol. 10(3), 1990, pp. 163-172.
Handbook of Adhesives Technology & Application, Beijing Adhesive Society, Aerospace Press, 1991, pp. 735-736.
Oldshue, "Fluid Mixing Technology", Chem. Industry Press, 1991, p. 279.
Teh, A Review of polyethylene-polypropylene blend and their compatibilization, Adv. Polymer Tech., vol. 13(1), 1994, pp. 1-23.
Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.
Ding et al., Thermal and catalytic degradation of high density polyethylene and commingled post-consumer plastic waste, Fuel Processing Technology, Mar. 1997, vol. 51, Issues 1-2, pp. 47-62.
Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.
Buekens et al., Catalytic plastics cracking for recovery of gasoline-range hydrocarbons from municipal plastic wastes, Resources, Conservation and Recycling, Aug. 1998, vol. 23, Issue 3, pp. 163-181.
Luo et al., Catalytic degradation of high density polyethylene and polypropylene into liquid fuel in a power-particle fluidized bed, Polymer Degradation and Stability, online, 2000, vol. 70(1), pp. 97-102.
Predel, "Pyrolysis of mixed polyolefins in a fluidised-bed reactor and on a pyro-GCMS to yield aliphatic waxes"; Polymer Degradation and Stability, 2000, vol. 70(3), pp. 373-385.
You et al., Liquid-phase catalytic degradation of polyethylene wax over silica modified zeolite catalysts, Polymer Degradation and Stability, 2001, vol. 265(2), pp. 329-336.
Seo et al., Investigation of Catalytic degradation of HDPE by hydrocarbon group type analysis, Journal of Analytical and Applied Pyrolysis, 2003, vol. 70, Issue 2, pp. 97-102.
Lai et al., Depolymerization of HDPE to wax in the presence of a catalyst formed by homonuclear macrocyclic zirconium complex chemically bonded to alumina support, Journal of Molecular Applied Catalysis A: General, 2006, vol. 303(1), pp. 9-17.
Lai et al., Development of heterogeneous catalyst by ionically bonding macrocyclic Zr-Zr complex to montmorillonite clay for depolymerization of polypropylene, Journal of Molecular Applied Catalysis A: Chemical, 2007, vol. 265(1-2), pp. 15-24.
Requena et al., "Encapsulation of Leu-Enkephalin in core-shell isobutylcyanoacrylate-thiolated chitosan hanoparticles for oral administration", J. Chilean Chem. Soc., 2008, vol. 53(4), pp. 1677-1681.
Aboulkas, Thermal degradation behaviors of polyethylene and polypropylene. Part 1: pyroloysis kinetics and mechanisms, Energy Conversion and Management, 2010, vol. 51, pp. 1363-1369.
Xanthos, Recycling of the #5 polymer, Science, 2012, vol. 337, pp. 700-702.
European Search Report dated Apr. 4, 2011 in connection with European Patent App. No. 10172039.
Extended European Search Report dated Apr. 15, 2011 in connection with European Patent App. No. 10172039.9-2104.
International Search Report and Written Opinion dated Jan. 5, 2012 issued in connection with International App. No. PCTIB2011001642.

International Preliminary Report on Patentability dated Aug. 1, 2012 issued in connection with International App. No. PCTIB2011001642.
International Search Report and Written Opinion dated Sep. 20, 2013 issued in connection with International App. No. PCTCA2013000041.
Office Action dated Apr. 4, 2014 issued in connection with Chinese App. No. 201180034887.0.
Kaitz et al., "Depolymerizable polymers:preparation, applications, and future outlook", MRS Comm., 2015, vol. 5, pp. 191-204.
Office Action dated Jun. 16, 2015 issued in connection with Japanese App. No. 2013-519172.
International Preliminary Report on Patentability dated Jul. 21, 2015 issued in connection with International App. No. PCTCA2013000041.
Office Action dated Oct. 15, 2015 issued in connection with Malaysian Patent App. No. 2013000128.
Office Action dated Feb. 29, 2016 issued in connection with Chinese App. No. 201510126290.9.
Office Action dated Oct. 5, 2016 issued in connection with Canadian App. No. 2805570.
Office Action dated Oct. 6, 2016 issued in connection with Canadian App. No. 2898257.
Gergo, P. et al. "Rheological Investigation of Rubber Bitumen Containing Various Waxes as Warm Mix Additive" Studia Ubb Chemia LXII, 2 Tom II, 2017 pp. 247-257.
International Search Report and Written Opinion dated Mar. 17, 2017 issued in connection with International App. No. PCTCA2016051555.
International Search Report and Written Opinion dated May 2, 2017 issued in connection with PCT/CA2017/050172.
International Search Report and Written Opinion dated Jul. 25, 2017 issued in connection with International App. No. PCT/CA2017/050378.
Office Action dated Nov. 30, 2017 issued in connection with Indian App. No. 316/KOLNP/2013.
International Search Report & Written Opinion dated Dec. 15, 2017 issued in connection with International App. No. PCT/CA2017/051166.
"Changing the Story of Waste Plastic (Crowdcube presentation)", Feb. 2018, Retrieved from the Internet: https://hkstartupresources.com/wpcontent/uploads/2018/02/recycling-technologies-ltdbusiness- plan.pdf [retrieved on Aug. 22, 2019].
International Preliminary Report on Patentability dated Jul. 12, 2018 in connection with International App. No. PCT/CA2016/051555.
Takuma, "Production of Aromatic Hydrocarbons by Catalytic Degradation of Polyolefins Over H-Gallosilicate", Ind. Eng. Chem. Res., 2001, pp. 1076-1082.
Lal et al., Depolymerization of HDPE to wax in the presence of a catalyst formed by homonuclear macrocyclic zirconium complex chemically bonded to alumina support, Journal of Molecular Applied Catalysis A: General, 2006, vol. 303(1), pp. 9-17.
Sari et al. "Recycling of Polyolefin Materials", Springer Series on Polymer and Composite Materials, (2016), pp. 315-339.
Sukorez® SU-90, Kolon Industries (Year: 2016).
Gergo, P. et al. "Rheological Investigation of Rubber Bitumen Containing Various Waxes as Warm Mix Additive" Studia Ubb Chemia LXII, 2 Tom II, 2017 p. 247-257.
DiMondo "An Added Benefit (Ceranovus A115 and A125)", Jan. 12, 2017, pp. 1-9, Retrieved from the Internet: https://www.professionalroofing.net/Articles/An-added-benefit [retrieved on Nov. 18, 2021].
"GreenMantra Technologies Introduce Ceranovus Polymer Additives at IRE", Feb. 6, 2018, Retrieved from the Internet https://www.roofingcontractor.com/articles/92693-greenmantratechnologies-introduce-ceranovus-polymer-additives-at-ire [retrieved on Nov. 18, 2021].
Notice of Acceptance dated Oct. 20, 2021 for Australian App. No. 2017218908.
European Search Report dated Oct. 20, 2021 issued in connection with European App. No. 18882986.5.

(56) References Cited

OTHER PUBLICATIONS

European Search Report dated Nov. 11, 2021 issued in connection with European App. No. 16880228.8.
European Search Report dated Nov. 29, 2021 issued in connection with European App. No. 19810083.6.
Office Action dated Oct. 24, 2022, issued in connection with Brazilian Application No. BR 11 2020 024525 9.
Examination Report dated Dec. 20, 2022, issued in connection with European Application No. 16 880 228.8.
Office Action dated Jan. 13, 2023, issued in connection with Canadian Application No. 3,129,563.
Office Action dated Feb. 6, 2023, issued in connection with Canadian Application No. 3,009,917.
Extended European Search Report dated Feb. 9, 2023, issued in connection with European Application No. 22179677.4.
"GreenMantra Technologies Introduces Ceranovus Wax Modifiers for Improved Asphalt Roofing Production and Performance", Sep. 12, 2016 pp. 1-3, Retrieved from the Internet: URL:https://www.prnewswire.com/news-releases/greenmantratechnologies-introduces-ceranovus-wax-modifiers-for-improved-asphaltroofing-production-and-performance [retrieved on Nov. 18, 2021].
Office Action dated Sep. 7, 2023, issued in connection with Mexican Application No. MX/a/2018/009808.
Office Action dated Oct. 20, 2023, issued in connection with Brazilian Application No. BR 112020004155-6.
Extended European Search Report dated Nov. 14, 2023, issued in connection with European Application No. 20898302.3.
Office Action dated Dec. 1, 2023, issued in connection with MX/a/2019/003575.
Office Action dated Dec. 12, 2023, issued in connection with Japanese Application No. 2021-533652.
Shang et al., "Investigation of Recycled Polyethylene Wax to Lower the Viscosity of SBS Modified Asphalt." Petroleum Asphalt, vol. 24, Issue 1, Feb. 28, 2010, pp. 64-69.
Office Action issued Apr. 16, 2024, issued in connection with Mexican Application No. MX/a/2019/003575.
Office Action dated May 17, 2024, issued in connection with European Application No. 17854306.2.
Office Action dated May 20, 2024, issued in connection with Chinese Application No. 201880076385.6.
Office Action dated Jun. 13, 2024, issued in connection with Chinese Application No. 201880056636.4.
Mpanza et al., "Influence of Different Waxes on the Physical Properties of Linear Low-density Polyethylene", South Africa J. of Chem., vol. 59, 2006, pp. 48-54.
Farahanchi et al., Effects of ultrahigh speed twin screw extrusion on the thermal and mechanical degradation of polystyrene, Polymer Engineering, 2016, vol. 6(7), pp. 743-751.
Shang et al., "Pyrolyzed Wax from Recycled Cross-Linked Polyethylene as Warm Mix Asphalt (WMA) Additive for SBS Modified Asphalt", Progress in Rubber, Plastics and Recycling Technology, vol. 27, 2011, pp. 133-144.
Xing, Yuqing, "Thermoplastic Plastics and Their Composites", Harbin Institute of Technology Press, Dec. 1990.
Requena et al. "Encapsulation of Leu-Enkephalin in core-Shell isobutylcyanoacrylate-thiolated chitosan nanoparticles for oral administration", J. Chilean Chem. Soc., 2008, vol. 53(4), pp. 1677-1681.
Halley et al., "Chemorheology of Polymers—From Fundamental Principles to Reactive Processing", Cambridge University Press, 2009, pp. 1-168.
Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.
"GreenMantra Technologies Introduces Ceranovus Wax Modifiers for Improved Asphalt Roofing Production and Performance", Sep. 12, 2016 pp. 1-3, Retrieved from the Internet:https://www.prnewswire.com/news-releases/greenmantratechnologies-introduces-ceranovus-wax-modifiers-for-improved-asphaltroofing-production-and-performance [retrieved on Nov. 18, 2021].
Office Action dated Dec. 11, 2024, issued in connection with Chinese Application No. 201880056636.4.
Office Action dated Dec. 13, 2024, issued in connection with Chinese Application No. 201880076385.6.
Office Action dated Jan. 7, 2025, issued in connection with Canadian Application No. 3,121,281.
Extended European Search Report dated Jan. 14, 2025, issued in connection with European Application No. 24167042.1.
Office Action dated Jan. 16, 2025, issued in connection with Mexican Application No. MX/a/2020/005399.
Office Action dated Jan. 16, 2025, issued in connection with European Application No. 23208314.7.
Office Action dated Jan. 24, 2025, issued in connection with Chinese Application No. 201980036433.3.
Office Action dated Feb. 10, 2025, issued in connection with Canadian Application No. 3,083,380.
Xinyuan, "Polymer Materials Processing Principle", China Textiles Press, Jul. 2000, pp. 84-85.
Lijiu, "New Roofing Materials", China Building Materials Industry Press, Oct. 2012, in pp. 30-32.
Changming, "Plastic Application Technology Manual", Mechanical Industry Press, May 2013, pp. 287-288.
Examination Report dated Jan. 22, 2025, issued in connection with European Application No. 18882986.5.
Office Action dated Mar. 6, 2025, issued in connection with Chinese Application No. 201980082937.9.
Office Action dated Jun. 28, 2024, issued in connection with Chinese Application No. 201980036433.3.
Office Action dated Jun. 29, 2024, issued in connection with Chinese Application No. 201980082937.9.
Office Action dated Sep. 3, 2024, issued in connection with Japanese Application No. 2020-566670.
Office Action dated Oct. 1, 2024, issued in connection with Japanese Application No. 2021-533652.
Partial Search Report dated Oct. 16, 2024, issued in connection with European Application No. 24167042.1.
Examiner's Report dated Nov. 12, 2024, issued in connection with Canadian Application No. 3,074,243.
Examiner's Report dated Jun. 13, 2025, issued in connection with Canadian Application No. 3,101,676.
Office Action dated Apr. 1, 2025, issued in connection with Japanese Application No. 2021-533652.
Examiner's Report dated May 6, 2025, issued in connection with Canadian Application No. 3,135,868.
Reexamination Notification dated May 16, 2025, issued in connection with Chinese Application No. 201780018293.8.
Examiner's Report dated Jun. 10, 2025, issued in connection with Canadian Application No. 3,229,291.
Tongkao, Practical Technology for Modification of Plastics, China Light Industry Press, Oct. 2012, pp. 44-45 and 49-50.
Ferraz et al., "Polystyrene recycling processes by dissolution in ethyl acetate", Journal of Applied Polymer Science, 2018.
International Preliminary Report on Patentability dated Sep. 28, 2021, in connection with International Application No. PCT/CA2020/050439.
Office Action dated Jan. 16, 2024, issued in connection with Japanese Application No. 2020-566670.
Product data sheet for Ceranovus A from Greenmantra Technologies (retrieved on Feb. 12, 2024).
Office Action dated Feb. 6, 2024, issued in connection with Canadian Application No. 3,036,136.
Examination Report dated Mar. 5, 2024, issued in connection with European Application No. 18851118.2.
Extended European Search Report dated Mar. 25, 2024, issued in connection with European Application No. 23208314.7.
Rejection Decision dated Jun. 23, 2025, issued in connection with Chinese Application No. 201880076385.6.
Office Action dated Jun. 30, 2025, issued in connection with Chinese Application No. 201880056636.4.
Rejection decision dated Aug. 4, 2025, issued in connection with Chinese Application No. 201980082937.9.
Office Action dated Aug. 5, 2025, issued in connection with Mexican Application No. MX/a/2020/005399.

(56) References Cited

OTHER PUBLICATIONS

Examiner's Report dated Sep. 4, 2025, issued in connection with Canadian Application No. 3,055,974.
Examination Report dated Jul. 18, 2025, issued in connection with European Application No. 19811163.5.
Niosh, "Asphalt Fume Exposures During the Application of Hot Asphalt to Roofs", DHHS (Niosh) Publication No. 2003-112, Jun. 2003.

* cited by examiner ring# USES OF STYRENIC POLYMERS DERIVED THROUGH DEPOLYMERIZED POLYSTYRENE

CROSS-REFERENCE TO RELATED APPLICATIONS

This application is a continuation of International Application No. PCT/CA2019/050761 having an international filing date of May 31, 2019, entitled "Uses of Styrenic Polymers Derived Through Depolymerized Polystyrene". The '761 application is related to and claims priority benefits from U.S. Provisional Application Ser. No. 62/678,780 filed on May 31, 2018, also entitled "Uses of Styrenic Polymers Derived Through Depolymerized Polystyrene". The '761 and '780 applications are hereby incorporated by reference herein in their entireties.

FIELD OF THE INVENTION

The invention relates to the use of styrenic polymers synthesised via depolymerization of polystyrene to produce water-based and solvent based formulations including but not limited to latexes and solutions with UV-active monomers. UV-active monomers used include but are not limited to acrylate based systems such as Trimethylolpropane triacrylate, 1,6-Hexanediol diacrylate, Poly(ethylene glycol) diacrylate, Ethoxylated pentaerythritol tetraacrylate, Propoxylated 1,6-Hexanediol Diacrylate, Ethoxylated 1,6-Hexanediol Diacrylate. In addition, the styrenic polymers synthesised via depolymerization of polystyrene are also readily soluble in organic solvents. Examples include but are not limited to chloroform, tetrahydrofuran, toluene, xylenes, cymene, or terpinenes. The resulting formulations can be used in various applications including, but not limited to, inks, paints, coatings, and adhesive formulations. In some embodiments, the resulting formulations act to offset/replace the polymers within these application formulations, such as styrenated acrylics. In some applications, the latexes utilizing polymers synthesised via depolymerization of polystyrene can be used directly as an offset to currently used styrene-based latexes. In some embodiments the polystyrene-based latexes can be used in immunoassay tests.

Polystyrene is among the fastest growing solid waste. Furthermore, polystyrene is non-biodegradable, leading to its accumulation in nature. Most of polystyrene waste is either land-filled or burnt. The former leads to the loss of material and waste of land, while the latter results in emission of green-house-gases. Only a small proportion of polystyrene waste is currently being recycled (at a rate less than 5% in North America and Europe) as secondary polymers.

Traditional polystyrene plastics are synthesised via polymerisation of styrene, which in turn is synthesised via the ethylation of benzene (often obtained from crude oil) to produce ethyl benzene and subsequent dehydrogenation of ethyl benzene to yield styrene.

Traditionally, polystyrene latexes are produced via emulsion polymerization (a technique in which polystyrene chains are built from monomer via emulsification). In typical embodiments, these latexes consist of polystyrene that has been modified to introduce polarity (for example via the addition of carboxylic acids or amine moieties).

Traditionally, UV-active monomers employed in formulations are acrylic based. Examples include, but are not limited to, Trimethylolpropane triacrylate, 1,6-Hexanediol diacrylate, Poly(ethylene glycol) diacrylate, Ethoxylated pentaerythritol tetraacrylate, Propoxylated 1,6-Hexanediol Diacrylate, Ethoxylated 1,6-Hexanediol Diacrylate.

Styrenic polymers derived from depolymerized polystyrene have different properties compared to the starting plastic feedstock and traditional polystyrene plastics are synthesised via polymerisation of styrene. For example, mid-molecular weight styrenic polymers produced via the depolymerization of polystyrene often contain specific structural or chemical properties, including, but not limited to olefin content or longer aliphatic sections near terminal positions of the chain. In addition, styrenic polymers produced via the depolymerization of polystyrene are often of a lower molecular weight.

SUMMARY OF THE INVENTION

In some embodiments latex(es)/solution(s) can be comprised of a styrenic polymer created via depolymerization of a polystyrene feedstock. In some embodiments, the polystyrene feedstock comprises recycled polystyrene and/or virgin polystyrene.

In some embodiments the particle size of the latex(es)/solution(s) is/are greater than 1 nanometer. In certain embodiments, the particle size of the latex(es)/solution(s) is/are between and inclusive of 150-220 nanometers.

In some embodiments the styrenic polymer is solubilized in a UV-active monomer creating a stable formulation.

In some embodiments, the styrenic polymer comprises at least one olefin on the backbone of the chain, typically near a terminal position. In certain embodiments, the olefin content is less than 1% of the total weight of the styrenic polymer.

In some embodiments, the styrenic polymer has a molecular weight between 20000-200000 amu.

In certain embodiments, the styrenic polymer has a melt flow index between and inclusive of 10 g/10 min to 200 g/10 min.

In some embodiments, inks can comprise, among other things, a latex comprising a styrenic polymer created via depolymerization of a polystyrene feedstock; a solvent; a pigment; and an additive. In some embodiments the pigment is selected from the group consisting of organic pigments or mineral pigments.

In some embodiments, inks can comprise, among other things, styrenic polymer created via depolymerization of a polystyrene feedstock; a UV-active monomer; an oligomer; a pigment; a photoinitiator and/or an additive. In some embodiments the pigment is selected from the group consisting of organic pigments or mineral pigments.

In some embodiments, paints, adhesives, and/or immunoassay tests can be comprised of, among other things, a latex/solution comprising a styrenic polymer created via depolymerization of a polystyrene feedstock.

In some embodiments, paints, coatings, and/or adhesives can be comprised of, among other things, a styrenic polymer created via depolymerization of a polystyrene feedstock.

In some embodiments, the styrenic polymer comprises at least one olefin. In some embodiments, the olefin is less than 1% of the total weight of said styrenic polymer.

DETAILED DESCRIPTION OF ILLUSTRATIVE EMBODIMENT(S)

Styrenic polymers derived from depolymerized polystyrene can be used where traditional higher molecular weight polystyrene plastic can not be used without modification. Such applications include, but are not limited to, inks, paints, coatings, adhesive formulations, and/or immunoassay tests.

Styrenic polymers derived from depolymerized polystyrene can also be used as replacement to traditionally used materials that originated from crude oil sources. One use for styrenic polymers created via depolymerization of polystyrene is to replace styrenated acrylics in aqueous inks such as flexo and gravure ink formulations. Traditionally styrenated acrylics are used in connection with solvents, pigments and additives in aqueous ink formulations. One problem with using polystyrene plastic in aqueous ink is they are insoluble due to the high molecular weight and lack of polarity. This challenge is overcome through the controlled depolymerization of polystyrene plastics to create styrenic polymers with lower molecular weights and greater polarity. The ability to tune the properties of the styrenic polymers derived from depolymerized polystyrene plastic allows styrenic polymer products to be designed specifically for use with latex formulations. Use of styrenic polymers derived from waste polystyrene plastic can help reduce greenhouse gases, landfill waste, and the need for the production of new styrenic products derived from fossil or virgin polystyrene.

A method for producing latex formulations using styrenic polymers is disclosed. These latexes can be used in various applications including inks.

In some embodiments, the polystyrene material is first be converted into the styrenic polymers. A process for achieving this is discussed in International Application PCT/CA2017/051166 which is hereby incorporated by reference. In some embodiments, the polystyrene material is recycled. Converting the polystyrene material into the styrenic polymers can include selecting a solid polystyrene material; heating the solid polystyrene material in an extruder to create a molten polystyrene material; filtering the molten polystyrene material; placing the molten polystyrene material through a chemical depolymerization process in a reactor to create styrenic polymer(s); cooling the styrenic polymer; and/or purifying the styrenic polymer(s).

In at least some embodiments, the materials do not need to be purified. In at least several embodiments, additives/residues do not disrupt the latex formulation. In at least some embodiments, the styrenic polymer(s) can be dispersed in water to create various latexes and/or emulsions. In at least some embodiments, this is accomplished via traditional emulsification techniques such as phase inversion emulsification in which the styrenic polymer is dissolved into a complementary solvent and transferred into an aqueous dispersion (latex) after which the original compatible solvent is stripped.

Figure 2:
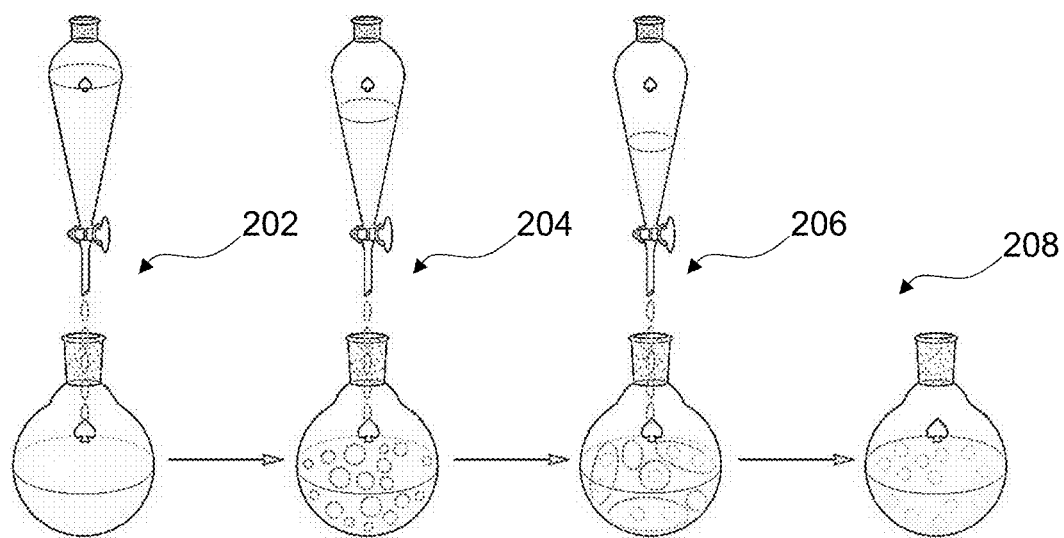
FIG. 2 is a schematic of a phase inversion emulsification procedure.

FIG. 2 illustrates an embodiment of phase inversion emulsification. In step 202 and 204 water is gradually added into a hydrophobic polymer dissolved in an organic solvent. In step 206 a saturated inversion occurs (the water droplet in the oil become oil droplets in water). In step 208 the organic solvent is removed by distillation resulting in a stable late emulsion.

Other processes can be used to form the latexes including, but not limited to, attrition of polymer(s) in water with at least one surfactant; homogenization of polymer(s) in at least one solvent with water and at least one emulsifier; mixing molten polymer(s) with at least one emulsifier and hot water under high pressure, high temperatures, and/or high shear force; and techniques utilizing ultrasound.

Latexes formed via the methods above can be used in various products including, but not limited to ink formulations. In some embodiments, these styrenic polymer latexes can replace styrenated acrylics within flexo and/or gravure ink formulations. Other applications of styrenic polymer latexes include, but are not limited to, coatings, paints, adhesives and immunoassays.

In at least some embodiments, the styrenic polymer(s) are soluble in organic mediums and/or aqueous formulations.

Another use for styrenic polymers created via depolymerization polystyrene is to replace traditional oligomeric components in solvent based ink formulations. Traditionally oligomers are used in connection with monomers, pigments, photoinitiators and additives in aqueous ink formulations.

In at least some embodiments, the styrenic polymers created via depolymerization polystyrene do not need to be purified. In at least several embodiments, additives/residues do not disrupt the solubilization process.

Other applications of styrenic polymer/UV-active monomer formulations include but are not limited to coatings, paints, adhesives.

Figure 3:
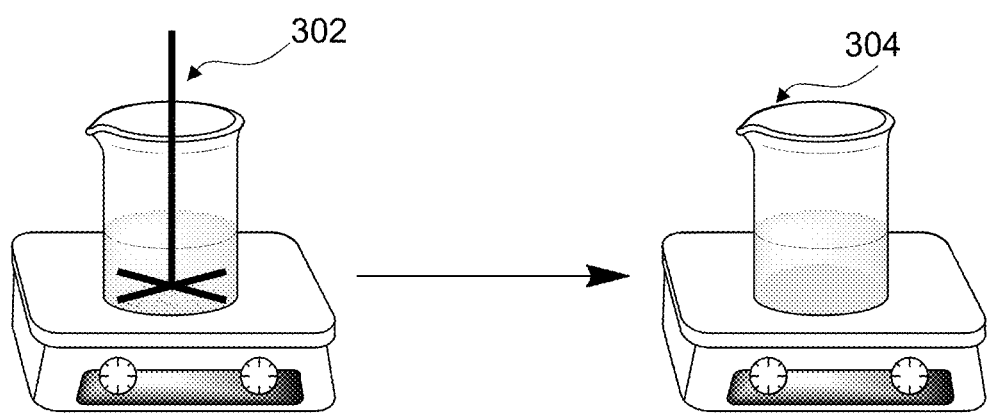
FIG. 3 is a schematic of the process by which a styrenic polymer/UV-active monomer blend is produced.

FIG. 3 illustrates an embodiment of styrenic polymer solubilisation in UV-active monomer. In step 302 styrenic polymer is gradually added into a UV-active monomer at a desired temperature. The mixture is then vigorously stirred to induce solubilization at step 304.

Figure 7:
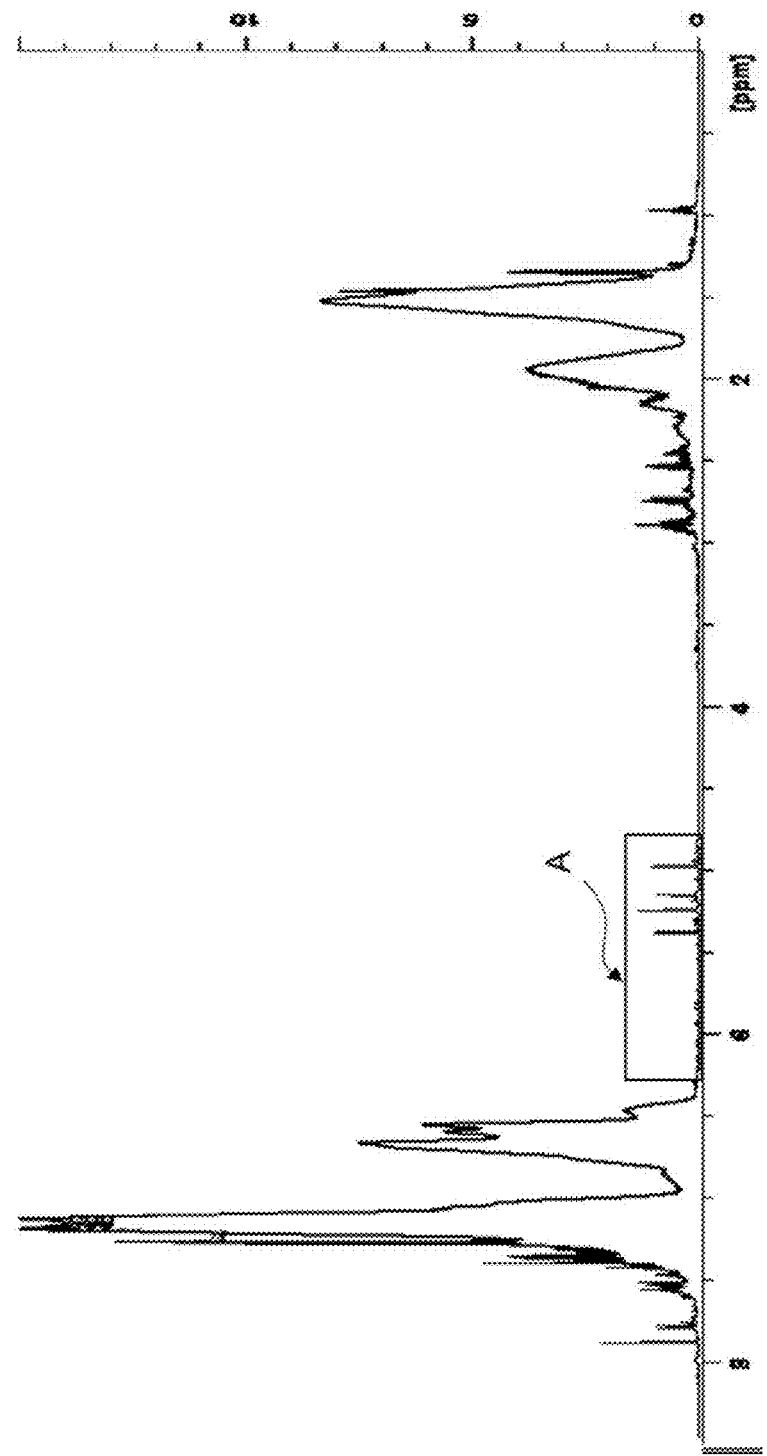
FIG. 7 is a Nuclear Magnetic Resonance (NMR) spectra of styrenic polymers produced via depolymerization.
Figure 8:
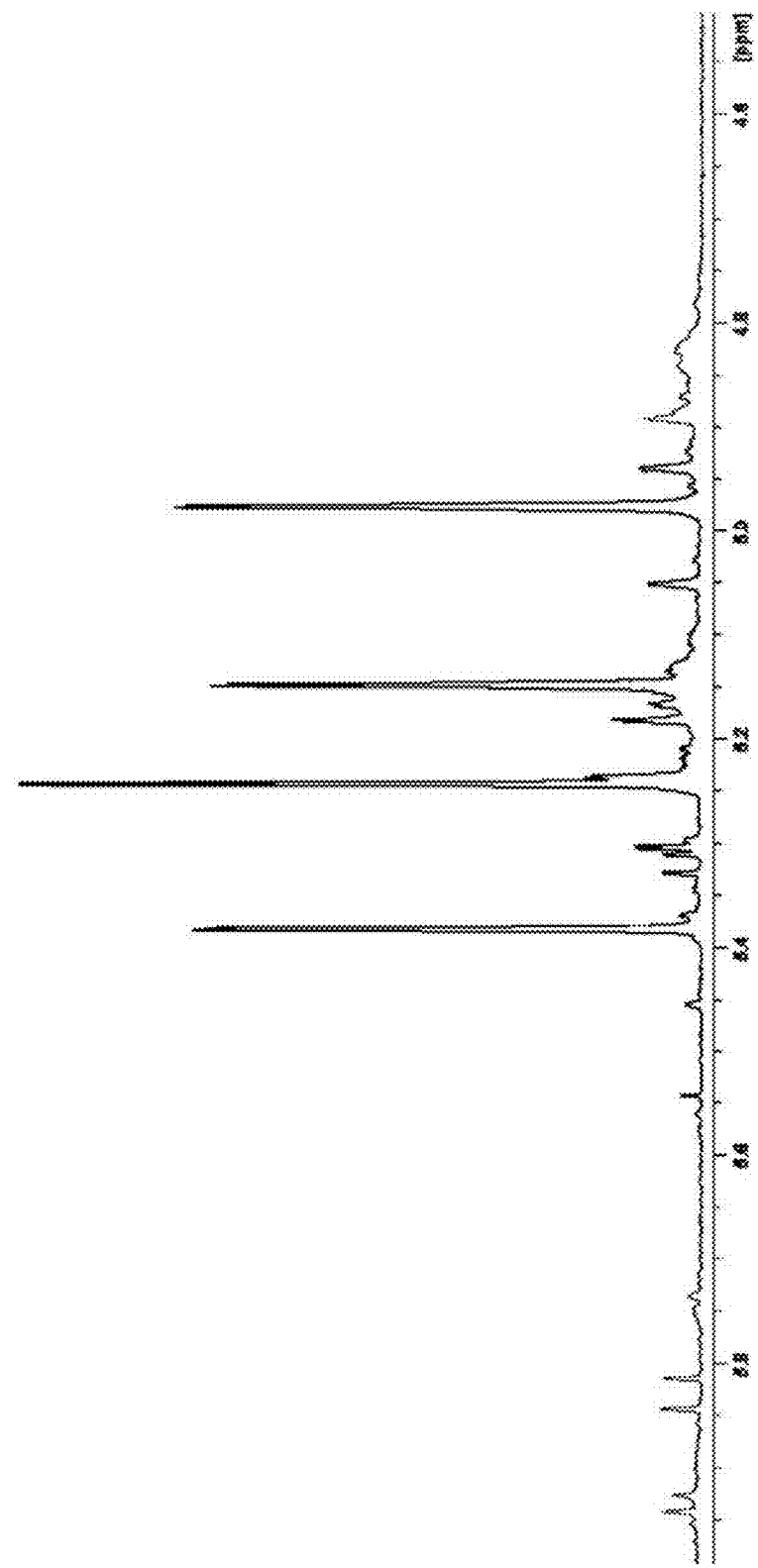
FIG. 8 is an enlarged version of section A of FIG. 7 showing the peaks corresponding to the presence of olefins.

In some embodiments, the styrenic polymer(s) contain active sites (such as olefin moieties). These active sites are often a signature of materials produced via a depolymerization process. In some embodiments, the depolymerization process incorporates additional olefin content into the backbone of the polymer. Backbone or terminal olefins are identifiable features that are not present in styrenic polymer derived through polymerization methods. FIG. 7 and FIG. 8 show Nuclear Magnetic Resonance (NMR) Spectra of styrenic polymer material, supporting the presence of olefin species. Backbone or terminal olefins, which involve double bonded carbon atoms, are more polar in nature compared to polymers with saturated backbones. This makes polymers with olefin content more compatible in aqueous latex formations than traditional polystyrene. The olefin content also lends itself to improved solubilisation in various UV-active monomers.

In some embodiments the styrenic polymers can be further modified to add additional active sites such as carboxylic acids, maleic acid, maleic anhydride, and amines. The active sites can serve functionalization purposes. In some embodiments, to improve compatibility and/or add function, various monomers and/or copolymers such as, but not limited to, acids, alcohols, acetates, amines, and alkenes such as hexene can be grafted onto the depolymerized product.

In some embodiments, to improve compatibility and/or add function, the various monomers and/or copolymers are grafted on via the olefin fingerprint. Grafting can take place, among other places, in a reactor, in line with the stream after cooling, and/or in a separate vessel.

In some embodiments, to improve compatibility and/or add function, the various monomers and/or copolymers are grafted on via the aromatic functionality. Grafting can take place, among other places, in a reactor, in line with the stream after cooling, and/or in a separate vessel.

In some embodiments, the polystyrene material can be dissolved in certain solvents prior to depolymerization to adjust the viscosity of the polymer at various temperatures. In some embodiments, organic solvents, such as toluene, xylenes, cymenes, or terpinenes, are used to dissolve the polystyrene before it undergoes depolymerization within the reactor bed/vessel. In certain embodiments, the desired product can be isolated via separation or extraction and the solvent can be recycled.

In at least some embodiments, solvents are not required.

In certain embodiments, the solid polystyrene material is a recycled polystyrene. In some embodiments, the recycled polystyrene is a pellet made from recycled polystyrene foam and/or rigid polystyrene. Suitable waste polystyrene material includes, but it not limited to, mixed polystyrene waste such as expanded, and/or extruded polystyrene foam, and/or rigid products. For example, foam food containers, or packaging products. The mixed polystyrene waste can include various melt flows and molecular weights. In some embodiments, the waste polystyrene material feed includes up to 25% of material that is other than polystyrene material, based on the total weight of the waste polystyrene material feed. In some embodiments, virgin polystyrene can also be used.

In some embodiments, the polymeric feed material is one of, or a combination of, virgin polystyrene and/or any one of, or combinations of post-industrial and/or post-consumer waste polystyrene.

In some embodiments, it is desirable to convert the polymeric feed material into lower molecular weight polymers, with increased melt flow and olefin content. In some embodiments, the conversion is affected by heating the polystyrene feed material to generate molten polystyrene material, and then contacting the molten polystyrene material with a catalyst material within a reaction zone disposed at a temperature between 200 degrees Celsius and 400 degrees Celsius, preferable between 275-375 degrees Celsius. In some embodiments, a catalyst is not required.

The molecular weight, polydispersity, glass transition, melt flow, and olefin content that is generated via the depolymerization depends on the residence time of the polystyrene material within the reaction zone.

In some embodiments the depolymerization process utilizes a catalyst such as [Fe—Cu—Mo—P]/$Al_2O_3$, Zeolite or alumina supported systems, and/or thermal depolymerization. In some embodiments, the catalyst can be contained in a permeable container. In some embodiments, the depolymerization can occur through the action of free radical initiators and/or exposure to radiation.

In some embodiments, the purification of styrenic polymers utilizes flash separation, distillation, vacuum stripping, absorbent beds, clay polishing and/or film evaporators.

Figure 1:
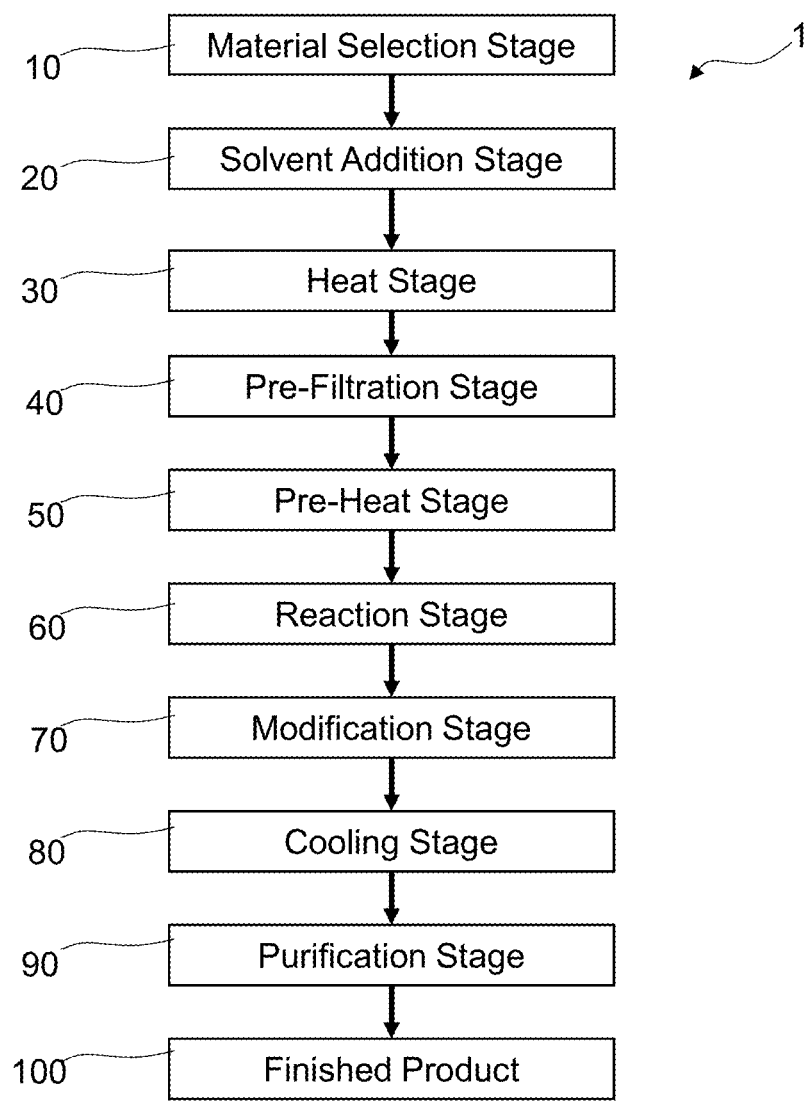
FIG. 1 is a flowchart illustrating a process for treating polystyrene material to create styrenic polymers.

FIG. 1 illustrates Process 1 for treating polystyrene material. Process 1 can be run in batches or a continuous process. The parameters of Process 1, including but not limited to temperature, flow rate of polystyrene, monomers/copolymers grafted during the reaction and/or modification stages, and total number of pre-heat, reaction, or cooling segments, can be modified to create styrenic polymers of varying molecular weights between and inclusive of 20,000-200,000 amu. In some more preferred embodiments, the styrenic polymers have varying molecular weights between and inclusive of 50,000-150,000 amu. In some even more preferred embodiments, the styrenic polymers have varying molecular weights between and inclusive of 55,000-120,000 amu.

In Material Selection Stage 10, polystyrene feed is sorted/selected and/or prepared for treatment. In some embodiments, the feed can contain up to 25% polyolefins, PET, EVA, EVOH, and lower levels of undesirable additives or polymers, such as nylon, rubber, PVC, ash, filler, pigments, stabilizers, grit or other unknown particles.

In some embodiments, the polystyrene feed has an average molecular weight between and inclusive of 150000 amu and 500000 amu. In some of these embodiments, the polystyrene feed has an average molecular weight between and inclusive of 200000 amu and 250000 amu.

In some embodiments, the material selected in Material Selection Stage 10 comprises recycled polystyrene. In other or the same embodiments, the material selected in Material Selection Stage 10 comprises recycled polystyrene and/or virgin polystyrene.

In Solvent Addition Stage 20, solvents, such as toluene, xylenes, cymenes, or terpinenes, are used to dissolve the polystyrene before it undergoes depolymerization within the reactor bed/vessels. In certain embodiments, the desired product can be isolated via separation or extraction and the solvent can be recycled.

In some embodiments, the material selected in Material Selection Stage 10 is can be heated in Heat Stage 30 an extruder and undergoes Pre-Filtration Process 40. In some embodiments, the extruder is used to increase the temperature and/or pressure of the incoming polystyrene and is used to control the flow rates of the polystyrene. In some embodiments, the extruder is complimented by or replaced entirely by pump/heater exchanger combination.

In some embodiments, the molten polystyrene material is derived from a polystyrene material feed that is heated to effected generation of the molten polystyrene material. In some embodiments, the polystyrene material feed includes primary virgin granules of polystyrene. The virgin granules can include various molecular weights and melt flows.

Pre-Filtration Process 40 can employ both screen changers and filter beds, along with other filtering techniques/devices to remove contaminants from and purify the heated material. The resulting filtered material is then moved into an optional Pre-Heat Stage 50 which brings the filtered material to a higher temperature before it enters Reaction Stage 60. Pre-Heat Stage 50 can employ, among other devices and techniques, static and/or dynamic mixers and heat exchangers such as internal fins and heat pipes.

Material in Reaction Stage 60 undergoes depolymerization. This depolymerization can be a purely thermal reaction and/or it can employ catalysts. Depending on the starting material and the desired styrenic polymer latex, depolymerization might be used for a slight or extreme reduction of the molecular weight of the starting material. In some embodiments, the catalyst used is a zeolite or alumina supported system or a combination of the two. In some embodiments, the catalyst is [Fe—Cu—Mo—P]/$Al_2O_3$ prepared by binding a ferrous-copper complex to an alumina or zeolite support and reacting it with an acid comprising metals and non-metals to obtain the catalyst material. In some embodiments, the catalyst comprises Al, Fe, Cu, and O, prepared by binding ferrous and copper complexes to an alumina and/or zeolite support. Other suitable catalyst materials include, but are not limited to, zeolite, mesoporous silica, H-mordenite and alumina. The system can also be run in the absence of a catalyst and produces lower molecular weight polymer through thermal degradation.

Reaction Stage 60 can employ a variety of techniques/devices including, among other things, fixed beds, horizontal and/or vertical reactors, and/or static mixers. In some embodiments, Reaction Stage 60 employs multiple reactors and/or reactors divided into multiple sections.

After Reaction Stage 60 the depolymerized material enters optional Modification Stage 70. Modification Stage 70 involves grafting various monomers and/or copolymers such as, but not limited to, acids, alcohols, acetates, and alkenes such as hexene onto the depolymerized product.

Cooling Stage 80 can employ heat exchangers, along with other techniques/devices to bring the styrenic polymer latex down to a workable temperature before it enters optional Purification Stage 80. In some embodiments, cleaning/purification of the styrenic polymers via such methods such as nitrogen stripping occurs before Cooling Stage 80.

Optional Purification Stage 90 involves the refinement and/or decontamination of the styrenic polymers. Techniques/devices that can be used in Purification Stage 90 include, but are not limited to, flash separation, absorbent beds, clay polishing, distillation, vacuum distillation and filtration to remove solvents, oils, color bodies, ash, inorganics, and coke. In some embodiments, a thin or wiped film evaporator is used to remove gas, oil, and/or grease and/or lower molecular weight functionalized polymers from the styrenic polymer latex. In some embodiments, the oil, gas, and lower molecular weight functionalized polymers can in turn be burned to help run various Stages of Process 1. In certain embodiments, the desired product can be isolated via separation or extraction and the solvent can be recycled.

Process 1 ends at Finished Product Stage 100 in which the initial starting material selected in Material Selection Stage 10 has been turned into a styrenic polymers. In at least some embodiments, the styrenic polymers do not need additional processing and/or refining. In other embodiments, the styrenic polymers created at Finished Product Stage, need additional modifications.

In some embodiments, the styrenic polymers has an average molecular weight between and inclusive of 20000 amu and 200000 amu, a melt flow between and inclusive of 0 g per 10 minutes and 100 g/10 min (determined via ASTM D1238). In some embodiments, the styrenic polymer has a glass transition temperature between and inclusive of 30-115° C.

In some of embodiments, the styrenic polymer has an average molecular weight between and inclusive of 40000-100000, a melt flow index between and inclusive of 10 g/10 min to 200 g/10 min (determined via ASTM D1238).

In some embodiments, the styrenic polymer comprises between 0.1% and 5% olefin content on the backbone of the chain.

In some embodiments, the styrenic polymer comprises greater than 50 ppm of zinc; greater than 20 ppm titanium; and/or greater than 20 ppm iron. In at least some embodiments, the presence of these metals confirms that the styrenic polymer was derived through either post-consumer or post-industrial waste polystyrene plastic. In some embodiments, these metals are well dispersed in the styrenic polymer adding both polarity and reactivity. This dispersion can make the styrenic polymer more compatible in various organic and aqueous solvent formations than traditional polystyrene. In addition, the added metal content can allow the styrenic polymer to act as a coupling agent with other multi-polymer systems.

In some embodiments the resulting latex has a particle size greater than 1 nanometer. In some embodiments the resulting latex has a particle size greater than 1 micrometer. In some embodiments, the resulting latex has particle size distributions between and inclusive of 50-300 nanometers. In some preferred embodiments, the resulting latex has particle size distributions between and inclusive of 100-250 nanometers. In some more preferred embodiments, the resulting latex has particle size distributions between and inclusive of 150-200 nanometers.

In some embodiments, the generated depolymerization product material includes monomer (styrene), aromatic solvents, polyaromatic species, oils, and/or lower molecular weight functionalized polymers, such as those with increased olefin content.

Example of Styrenic Polymers Latex Ink Formulations

Figure 4:
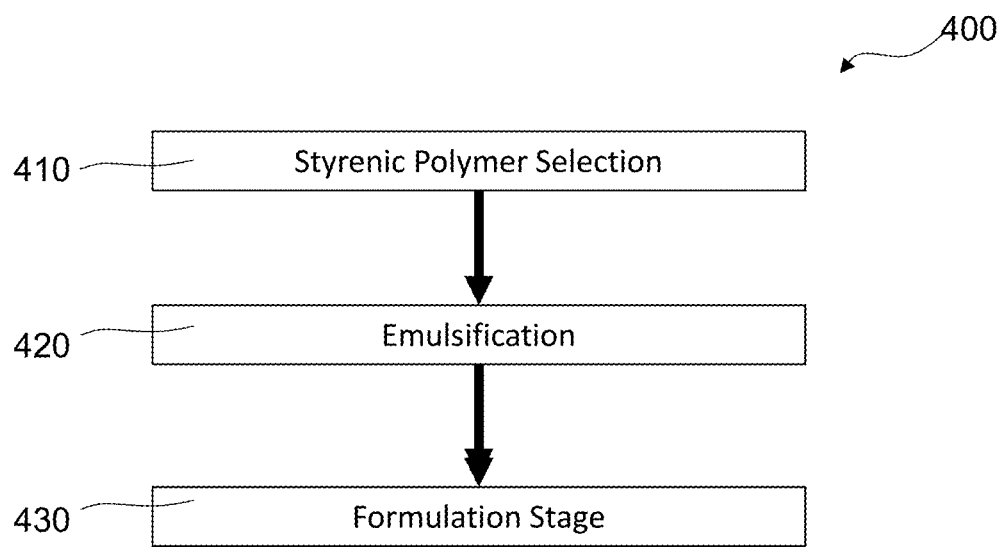
FIG. 4 is a flowchart illustrating a process for using styrenic polymers to create inks.

FIG. 4 shows Process 400 for using a styrenic polymer product created via a depolymerization process (such as the one described in FIG. 1) to create a finished product, such as, but not limited to, an ink. First a styrenic polymer product is chosen in Styrenic Polymer Selection 410. The styrenic polymer is then emulsified in Emulsification Stage 420 to create a latex. The resulting latex is then added in Formulation Stage 430 to create a finished product (such as an ink).

Figure 6:
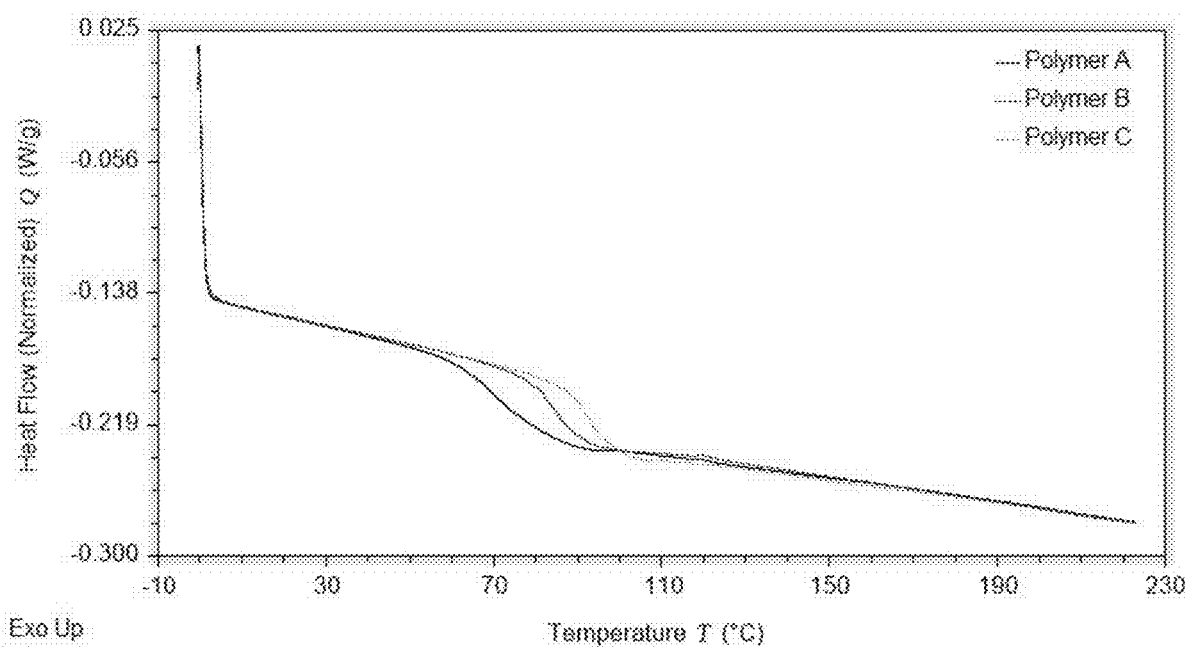
FIG. 6 is an overlay of a series of Differential Scanning Calorimetry (DSC) thermograms of various styrenic polymers produced via depolymerization of polystyrene.

In an illustrative embodiment of the present process, three styrenic polymers formed via depolymerization of polystyrene were identified for possible latex formulations. (See Table 1). Polymer A (which had a low molecular weight); Polymer B (which had a mid-range molecular weight); and Polymer C (which had a high molecular weight). As a result of the varying molecular weight of the three polymers, the glass transition temperatures also varied. FIG. 6 shows an overlay of differential scanning calorimetry thermograms of polymers A-C showing variances in the glass transition temperatures.

TABLE 1

Styrenic Polymers

| | Polymer A | Polymer B | Polymer C |
|---|---|---|---|
| Mw (Weight-average molecular weight as determined by gel permeation chromatography) | 56167 | 88901 | 104915 |
| MFI (Melt Flow Index as determined by ASTM D1238) | >50 | 29.67 | 9.66 |

TABLE 1-continued

Styrenic Polymers

|  | Polymer A | Polymer B | Polymer C |
|---|---|---|---|
| Glass Transition Temperature$_{initial}$ (As determined by differential scanning calorimetry) | 63.81 | 73.19 | 88.71 |
| Glass Transition Temperature$_{mid}$ (As determined by differential scanning calorimetry) | 80.91 | 85.18 | 95.34 |
| Glass Transition Temperature$_{end}$ (As determined by differential scanning calorimetry) | 97.78 | 97.17 | 101.79 |
| Solid Loading Range | 24.7 | 28.4 | 27.9 |

Each of the polymer samples was successfully formed into a latex via phase inversion emulsification. In some of these embodiments the latexes are stable for over a year at room temperature with solid loading ranges between 10% and 70%. In some preferred embodiments the latexes are stable for over a year at room temperature with solid loading ranges between 20 and 60%. In some more preferred embodiments, the latexes are stable for over two years at room temperature with solid loading ranges between 25 and 45%.

Figure 10:
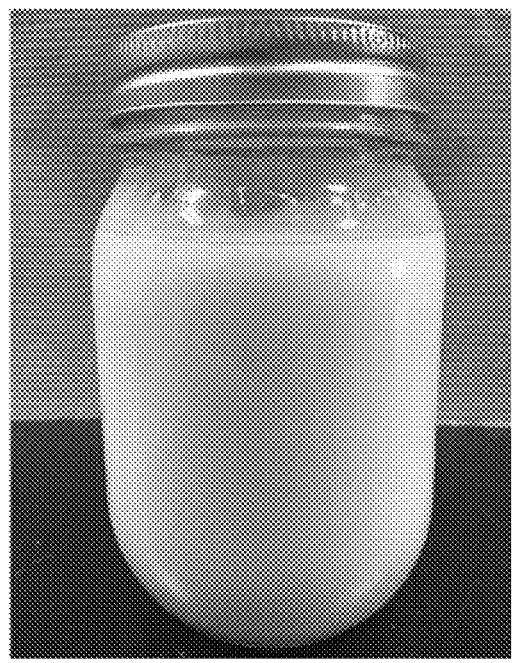
FIG. 10 is a photograph of a styrenic polymer latex.

FIG. 10 is a photograph of a styrenic polymer latex. The sample in the image is over 24 months old with no phasing/separation/destabilisation occurring.

These latex formulations were then used to create various ink formulations (Polymer A Ink, Polymer B Ink, and Polymer C Ink) as show in Table 2.

TABLE 2

Ink Components as Percentage of Total Weight

|  | Polymer A Ink | Polymer B Ink | Polymer C Ink | Control Ink |
|---|---|---|---|---|
| Acrylic Polymer Solution (30%) | 10.0 | 10.0 | 10.0 | 10.0 |
| Polymer A (24.7%) | 45.5 | 0 | 0 | 0 |
| Polymer B (28.4%) | 0 | 41.0 | 0 | 0 |
| Polymer C (27.9%) | 0 | 0 | 41.9 | 0 |
| Acrylic Dispersion (30%) | 0 | 0 | 0 | 30 |
| Water | 0 | 4.5 | 3.6 | 15.5 |
| Hydrophilic solvent | 1.0 | 1.0 | 1.0 | 1.0 |
| PE Wax | 3.0 | 3.0 | 3.0 | 3.0 |
| Surfactant | 0.5 | 0.5 | 0.5 | 0.5 |
| Cyan Pigment Dispersion | 40.0 | 40.0 | 40.0 | 40.0 |

Polymer A, B and C Inks along with Control Ink underwent several tests. The styrenic inks, performed at least as good (rub resistance, coefficient of friction), if not better (blocking, reduced ink transfer during rub testing, overall image robustness) than the Control Ink in all the tests. This indicates that styrenic polymers formed via the depolymerization of waste polystyrene can act as substitutes for styrenated acrylics (derived from fossil fuel sources) in aqueous ink formulations. The improved efficacy of the ink formulation is likely due to the hydrophobic nature of the polymer and the molecular weight of the styrenic polymers used. The highest molecular weight polymer, Polymer C, afforded significantly reduced ink transfer during rub testing and improved the image robustness of the ink. There were gradual improvements as the molecular weight of the polymer increased (i.e. from Polymer A to Polymer C).

TABLE 3

Ink Tests

| Test |  | Polymer A Ink | Polymer B Ink | Polymer C Ink | Control Ink |
|---|---|---|---|---|---|
| Rub Resistance | Receptor Cyan OD Average | 0.14 | 0.04 | 0.04 | 0.04 |
|  | Receptor Cyan OD Average Standard Deviation | 0.05 | 0.01 | 0.01 | 0.01 |
|  | Receptor Cyan b* Average | −13.02 | −7.07 | −1.57 | −6.74 |
|  | Receptor Cyan b* Average Standard Deviation | 1.57 | 0.54 | 0.6 | 0.55 |
| Coefficient of Friction | Average Static Coefficient of Friction | 0.41 | 0.39 | 0.39 | 0.31 |
|  | Standard Deviation Static Coefficient of Friction | 0.01 | 0.04 | 0.01 | 0.03 |
|  | Average Kinetic Coefficient of Friction | 0.41 | 0.38 | 0.39 | 0.35 |
|  | Standard Deviation Kinetic Coefficient of Friction | 0.01 | 0.01 | 0.00 | 0.03 |
| Scratch Test | Ink Removed by Scratch | No | No | No | No |
|  | Glossy trace from scratch | Yes | Yes | Yes | Yes |
|  | Degree of glossiness | Moderate | Moderate | Moderate | Mild |

TABLE 3-continued

Ink Tests

| Test | | Polymer A Ink | Polymer B Ink | Polymer C Ink | Control Ink |
|---|---|---|---|---|---|
| Blocking (Ink to Receptor) | SIR Rating at 60° C. | 5.0 | 5.0 | 5.0 | 4.5 |
| | SIR Rating at 70° C. | 5.0 | 5.0 | 5.0 | 4.0 |
| | SIR Rating at 80° C. | 4.5 | 5.0 | 5.0 | 3.0 |
| Blocking (Ink to Ink) | SIR Rating at 60° C. | 5.0 | 5.0 | 5.0 | 4.5 |
| | SIR Rating at 70° C. | 5.0 | 5.0 | 5.0 | 4.5 |
| | SIR Rating at 80° C. | 5.0 | 5.0 | 5.0 | 4.0 |

Figure 9:
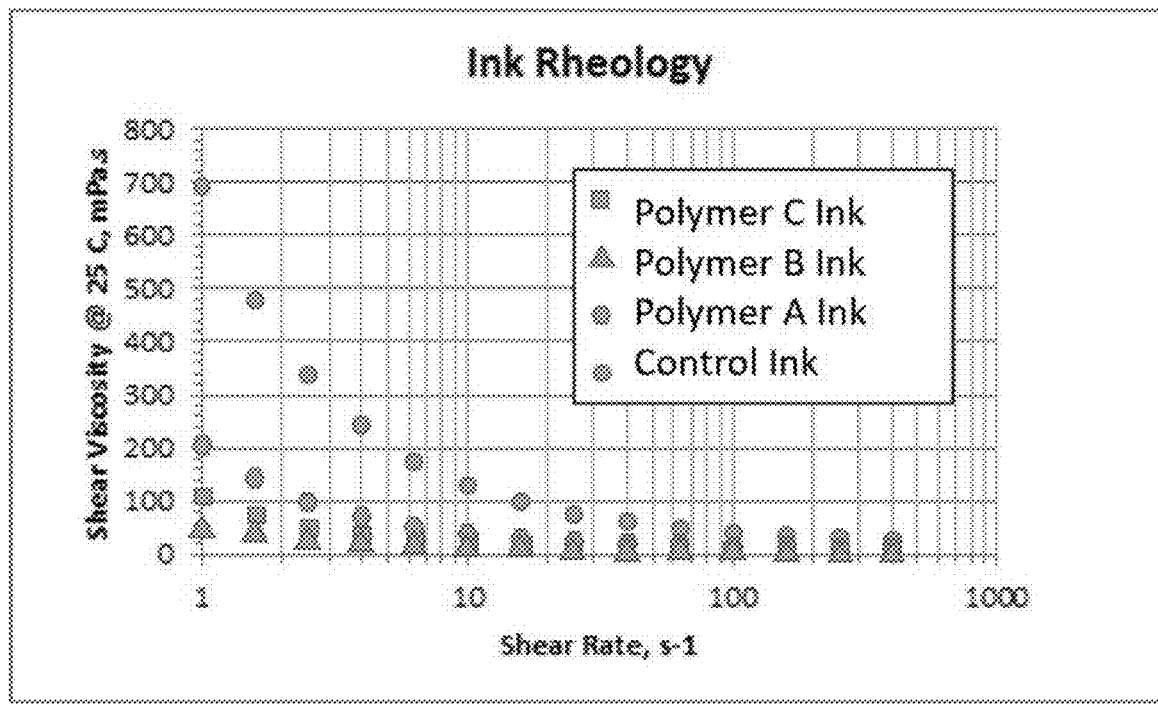
FIG. 9 is a graph showing the rheology of various inks, including those made with styrenic polymers created via the depolymerization of polystyrene.

In addition, the shear viscosity of Ink Formulations Polymer A, B and C was significantly lower than that of the Control Ink. FIG. 9 shows the rheology curves for Polymer Inks A-C as well as the Control Ink. Rheological properties are somewhat dependent on the target application; however, a reduction in shear viscosity allows for the ink to flow more effectively. This reduction is typically beneficial in flexo and gravure ink applications. In addition, styrenic polymers can act as rheology additives/modifiers. As demonstrated, different styrenic polymers can be used and the rheology of the ink formulation can be modified and manipulated to meet the demands/needs of the targeted formulation without adversely affecting the overall print properties of the ink.

Example of Styrenic Polymer/UV-Active Monomer Formulations

Figure 5:
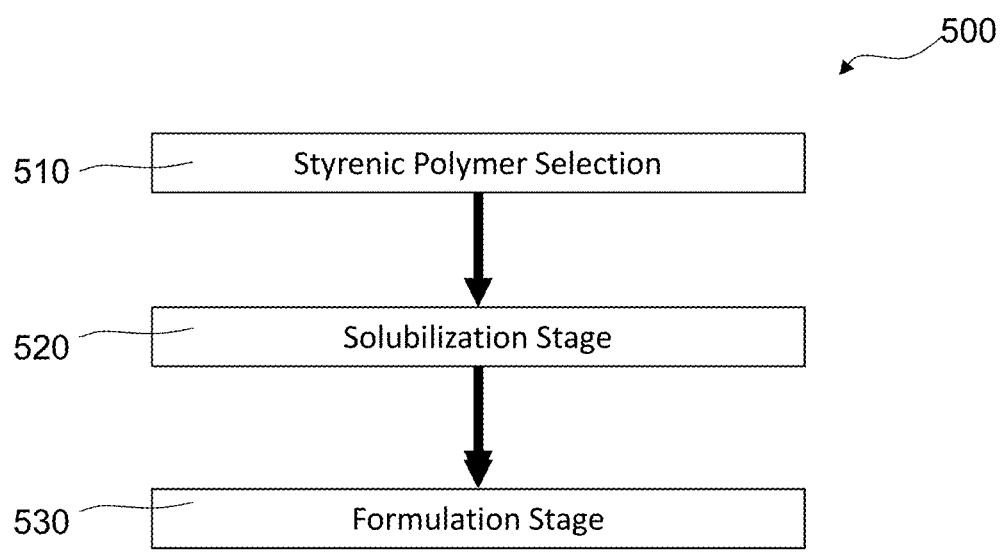
FIG. 5 is a flowchart illustrating a process for using styrenic polymers to create oligomer/monomer formulations.

FIG. 5 shows Process 500 for using a styrenic polymer product created via a depolymerization process (such as the one described in FIG. 1) to create a finish product, such as, but not limited to, an ink. First a styrenic polymer product is chosen in Styrenic Polymer Selection 510. The styrenic polymer is then solubilized in Solubilization Stage 520 to create a stable oligomer/monomer formulation. The resulting blend is then added in Formulation Stage 530 to create a finished product (such as an ink).

In an illustrative embodiment of the present process, styrenic polymers formed via depolymerization of polystyrene were identified for possible monomer solubilisation formulations. See Table 4.

TABLE 4

Styrenic Polymer

| | Polymer E | Polymer F |
|---|---|---|
| MFI (Melt Flow Index as determined by ASTM DI238) | >50 | >50 |
| Glass Transition Temperature$_{initial}$ (As determined by differential scanning calorimetry) | 37.76 | 54.15 |
| Glass Transition Temperature$_{mid}$ (As determined by differential scanning calorimetry) | 63.87 | 63.32 |
| Glass Transition Temperature$_{end}$ (As determined by differential scanning calorimetry) | 89.98 | 72.52 |
| Concentration of oligomer in UV-Active monomer | 35-50 | 35-50 |

The styrenic polymers were successfully solubilized into the UV-Active monomers with styrenic polymer concentrations ranging between and inclusive of 35 and 60% as shown in Table 5. In some preferred embodiments, the blends are stable with styrenic polymer concentrations ranging between and inclusive of 45 and 60%. In some more preferred embodiments, the blends are stable with styrenic polymer concentrations ranging between and inclusive of 50 and 60%.

Figure 11:
FIG. 11 is a photograph of a styrenic polymer/UV-active monomer blend.

FIG. 11 is a photograph of a styrenic polymer/UV-Active monomer formulation. The sample in the image is over 6 months old with no phasing/separation/destabilization occurring.

TABLE 5

Styrenic Polymer/UV-Active Monomer Solutions

| | Formulation | | | | | | | | |
|---|---|---|---|---|---|---|---|---|---|
| | 1 | 2 | 3 | 4 | 5 | 6 | 7 | 8 | 9 |
| Styrenic Polymer E (Table 4) | 50 | 55 | 45 | 60 | 35 | 50 | 35 | 60 | 0 |
| Styrenic Polymer F (Table 4) | 0 | 0 | 0 | 0 | 0 | 0 | 0 | 0 | 50 |
| 1,6-Hexanediol | 0 | 0 | 0 | 0 | 0 | 50 | 65 | 40 | 0 |
| Propoxylated 1,6-Hexanediol diacrylate | 50 | 45 | 55 | 40 | 65 | 0 | 0 | 0 | 0 |
| Ethoxylated 1,6-Hexanediol Diacrylate | 0 | 0 | 0 | 0 | 0 | 0 | 0 | 0 | 50 |
| Soluble Blend Formed | Yes | Yes | Yes | Yes | Yes | Yes | Yes | Yes | Yes |

In another set of trials, Polymer E was solubilized with 1,6-hexanediol and Trimethylolpropane Triacrylate. These formulations were then used to create various ink formulations as show in Table 6.

TABLE 6

UV-Curable Formulations with Standard Composition and with Styrenic Polymer

|  | Component | Standard | 5% | 10% | 15% |
|---|---|---|---|---|---|
| Oligomer | Polyester Acrylate | 58.23 | 53.73 | 49.00 | 43.00 |
| Reactive Diluent | 1,6-Hexanediol diacrylate | 23.49 | 23.09 | 23.09 | 24.09 |
| Reactive Diluent | Trimethylolpropane triacrylate | 9.5 | 9.4 | 9.13 | 9.13 |
| Photoinitiator 1 | Irgacure 819 | 2.94 | 2.94 | 2.94 | 2.94 |
| Photoinitiator 2 | Irgacure 184 | 5.84 | 5.84 | 5.84 | 5.84 |
| Styrenic Polymer | Polymer E (Table 4) | 0 | 5 | 10 | 15 |
| Total | — | 100 | 100 | 100 | 100 |

In these examples, the UV-curable formulations with the styrenic polymer performed similarly to the standard formulation in terms of the application on the substrate, UV-curing, and homogeneity of the resulting films on black coated paper.

While particular elements, embodiments and applications of the present invention have been shown and described, it will be understood, that the invention is not limited thereto since modifications can be made without departing from the scope of the present disclosure, particularly in light of the foregoing teachings. For example, the numerous embodiments demonstrate that different combinations of components are possible within the scope of the claimed invention, and these described embodiments are demonstrative and other combinations of the same or similar components can be employed to achieve substantially the same result in substantially the same way. Further, all of the claims are hereby incorporated by reference into the description of the preferred embodiments.

What is claimed is:

1. A water-based ink comprising:
   a pigment;
   an additive;
   a latex comprising a styrenic polymer created via depolymerization of a recycled polystyrene feedstock via a depolymerization process; and
   an UV-active monomer,
   wherein said styrenic polymer has a weight average molecular weight between 50000-150000 amu,
   wherein the particle size of said latex is greater than 1 micrometer,
   wherein said depolymerization process utilizes a catalyst, and
   wherein said styrenic polymer comprises:
   greater than 50 ppm of zinc;
   greater than 20 ppm titanium; and
   greater than 20 ppm iron.

2. The water-based ink of claim 1 further comprising:
   a photoinitiator.

3. The water-based ink of claim 2 wherein said pigment is an organic pigment.

4. The water-based ink of claim 2 wherein said pigment is a mineral pigment.

5. The water-based ink of claim 2 wherein said styrenic polymer comprises an at least one olefin moiety.

6. The water-based ink of claim 2 wherein said weight average molecular weight is between 55,000-120,000 amu.

7. The water-based ink of claim 2 wherein said styrenic polymer has a melt flow index between and inclusive of 10 g/10 min to 200 g/10 min.

8. The water-based ink of claim 1 wherein said pigment is an organic pigment.

9. The water-based ink of claim 1 wherein said pigment is a mineral pigment.

10. The water-based ink of claim 1 wherein said styrenic polymer comprises an at least one olefin moiety.

11. The water-based ink of claim 1 wherein said weight average molecular weight is between 55,000-120,000 amu.

12. The water-based ink of claim 1 wherein said styrenic polymer has a melt flow index between and inclusive of 10 g/10 min to 200 g/10 min.

13. The water-based ink of claim 1 wherein said UV-active monomer is trimethylolpropane triacrylate.

14. The water-based ink of claim 1 wherein said UV-active monomer is poly (ethylene glycol) diacrylate.

15. The water-based ink of claim 2 wherein said UV-active monomer is trimethylolpropane triacrylate.

16. The water-based ink of claim 2 wherein said UV-active monomer is poly (ethylene glycol) diacrylate.

* * * * *